United States Patent
Lee et al.

(10) Patent No.: US 11,647,515 B2
(45) Date of Patent: *May 9, 2023

(54) METHOD AND APPARATUS FOR TRANSMITTING OR RECEIVING SIGNAL IN WIRELESS COMMUNICATION SYSTEM

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,229

(22) Filed: Oct. 27, 2021

(65) Prior Publication Data

US 2022/0053545 A1 Feb. 17, 2022

Related U.S. Application Data

(63) Continuation of application No. 16/646,453, filed as application No. PCT/KR2019/001833 on Feb. 14, 2019, now Pat. No. 11,202,309.

(Continued)

(30) Foreign Application Priority Data

May 11, 2018 (KR) .......................... 10-2018-0054412

(51) Int. Cl.
*H04L 5/00* (2006.01)
*H04W 72/12* (2023.01)
(Continued)

(52) U.S. Cl.
CPC ....... *H04W 72/1289* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS 10,506,652 B2    12/2019   Davydov et al.
10,623,147 B2 *   4/2020   Hwang ............ H04W 72/0446
(Continued)

FOREIGN PATENT DOCUMENTS

CN          107078842        8/2017
EP           3393073 A2 * 10/2018        H04B 7/0456
(Continued)

OTHER PUBLICATIONS

EP partial supplementary European search report, in European Appln. No. 19753839.0, dated Nov. 27, 2020, 15 pages.

(Continued)

*Primary Examiner* — Ajit Patel
(74) *Attorney, Agent, or Firm* — Fish & Richardson P.C.

(57) ABSTRACT

A method and an apparatus for receiving a signal by a terminal in a wireless communication system according to an embodiment of the present invention comprises the steps of: establishing an RNTI associated with an MCS by a terminal; receiving a control channel for scheduling transmission of an uplink data channel or reception of a downlink data channel; and transmitting the uplink data channel or receiving the downlink data channel on the basis of one MCS table of a plurality of MCS tables, wherein the uplink data channel or the downlink data channel has been scheduled by the control channel and the one MCS table is determined on the basis of an RNTI associated with the MCS and an RNTI associated with the control channel.

5 Claims, 8 Drawing Sheets

Related U.S. Application Data

(60) Provisional application No. 62/688,987, filed on Jun. 22, 2018, provisional application No. 62/634,185, filed on Feb. 22, 2018, provisional application No. 62/630,264, filed on Feb. 14, 2018.

(51) Int. Cl.
*H04L 1/00* (2006.01)
*H04W 8/24* (2009.01)

(52) U.S. Cl.
CPC .......... *H04L 1/0016* (2013.01); *H04L 5/0007* (2013.01); *H04L 5/0042* (2013.01); *H04W 8/24* (2013.01)

(56) References Cited

U.S. PATENT DOCUMENTS

| | | | |
|---|---|---|---|
| 11,012,280 B2 * | 5/2021 | Moroga | H04L 27/2647 |
| 2017/0070374 A1 | 3/2017 | Nakamura et al. | |
| 2018/0049272 A1 * | 2/2018 | Bagheri | H04W 72/12 |
| 2018/0206258 A1 * | 7/2018 | Hosseini | H04W 28/0257 |
| 2019/0052332 A1 | 2/2019 | Shimezawa | |
| 2019/0132896 A1 | 5/2019 | Kusashima et al. | |
| 2019/0174495 A1 | 6/2019 | Sahlin et al. | |
| 2019/0223204 A1 * | 7/2019 | Kim | H04W 72/14 |
| 2019/0373560 A1 | 12/2019 | Ouchi et al. | |
| 2020/0068537 A1 | 2/2020 | Oh et al. | |

FOREIGN PATENT DOCUMENTS

| | | | |
|---|---|---|---|
| EP | 3944551 A1 * | 1/2022 | H04L 1/18 |
| KR | 20160108544 | 9/2016 | |
| KR | 20160135184 | 11/2016 | |
| KR | 20170058237 | 5/2017 | |
| WO | WO2016163843 | 10/2016 | |
| WO | WO2018009037 | 1/2018 | |

OTHER PUBLICATIONS

Ericsson, "Remaining aspects on CSI for 1 ms TTI," R1-1708858, Presented at 3GPP TSG-RAN WG1 Meeting #89, Hangzhou, P.R. China, May 15-19, 2017, 2 pages.
Ericsson, "Shortened TTI and short processing time—Collection of RAN1 agreements sorted per topic," R1-1719213, 3GPP TSG RAN WG1 Meeting #90bis, Prague, Czech Rep., dated Oct. 9-13, 2017, 26 pages.
Ericsson, "UE capabilities for sTTI," R1-1717176, 3GPP TSG-RAN WG1 Meeting #90bis, Prague, Czech Republic, dated Oct. 9-13, 2017, 3 pages.
Huawei, HiSilicon, "Link adaption and CSI reporting for URLLC transmission," R1-1715414, 3GPP TSG RAN WG1 Meeting NR#3, Nagoya, Japan, dated Sep. 18-21, 2017, 10 pages.
Intel Corporation, "On 1024QAM support," R1-1717337, 3GPP TSG RAN WG1 Meeting 90bis, Prague, CZ, dated Oct. 9-13, 2017, 5 pages.
Intel Corporation, "On 1024QAM support," R1-1720038, 3GPP TSG RAN WG1 Meeting 9, 3GPP TSG RAN WG1 Meeting 9, Reno, USA, dated Nov. 27-Dec. 1, 2017, 7 pages.
JP Office Action in Japanese Appln. No. 2020-508524, dated Mar. 2, 2021, 5 pages (with English translation).
LG Electronics, "Discussion on CSI for sTTI operation," R1-1717255, 3GPP TSG RAN WG1 Meeting #90bis, Prague, Czech Republic, dated Oct. 9-13, 2017, 7 pages.
LG Electronics, "Discussion on interaction between different TTI lengths," R1-1717248, 3GPP TSG RAN WG1 Meeting #90bis, Prague, Czech Republic, dated Oct. 9-13, 2017, 7 pages.
Office Action in European Appln. No. 19753839.0, dated Sep. 24, 2021, 10 pages.
Office Action in Indian Appln. No. 202027000585, dated Jun. 15, 2021, 8 pages (with English translation).
Panasonic, "MCS Indication for 256QAM," R1-140502, 3GPP TSG-RAN WG1 Meeting 76, Prague, Czech Republic, dated Feb. 10-14, 2014, 6 pages.
Qualcomm Incorporated, "CSI Reporting for sTTI," R1-1718108, 3GPP TSG RAN WG1 #90b, Prague, Czech Republic, dated Oct. 9-13, 2017, 5 pages.
Vivo, "RNTI and CRC size for NR," R1-1700280, 3GPP TSG RAN WG1 AH_NR Meeting, Spokane, USA, dated Jan. 16-20, 2017, 4 pages.
Ericsson, "RAN1 decisions for WI Shortened TTI and processing time for LTE (LTE_sTTiandPT)—per topic," R1-1721313 (Revision of R1-1719247), Presented at 3GPP TSG RAN WG 1 Meeting #91, Reno, USA, Nov. 27-Dec. 1, 2018, 42 pages.
Office Action in Chinese Appln. No. 201980004718.9, dated Jan. 13, 2022, 13 pages (with English translation).
Office Action in European Appln. No. 19753839.0, dated Mar. 10, 2022, 10 pages.
Qualcomm Incorporated, "Remaining details of DL data channel design," R1-1720396, Presented at 3GPP TSG RAN WG1 #91, Nov. 27-Dec. 1, 2017, Reno, Nevada, U.S.A., 10 pages.

* cited by examiner 2 symbol TTI DL structure 3 symbol TTI DL structure 4 symbol TTI DL structure 7 symbol TTI DL structure <3,2,2,2,2,3> sTTI pattern <2,3,2,2,2,3> sTTI pattern

METHOD AND APPARATUS FOR TRANSMITTING OR RECEIVING SIGNAL IN WIRELESS COMMUNICATION SYSTEM

CROSS-REFERENCE TO RELATED APPLICATIONS

This application is a continuation of U.S. application Ser. No. 16/646,453, filed on Mar. 11, 2020, which is a National Stage application under 35 U.S.C. § 371 of International Application No. PCT/KR2019/001833, filed on Feb. 14, 2019, which claims the benefit of U.S. Provisional Application No. 62/688,987, filed on Jun. 22, 2018, Korean Application No. 10-2018-0054412, filed on May 11, 2018, U.S. Provisional Application No. 62/634,185, filed on Feb. 22, 2018, and U.S. Provisional Application No. 62/630,264, filed on Feb. 14, 2018. The disclosures of the prior applications are incorporated by reference in their entirety.

TECHNICAL FIELD

The present disclosure relates to a wireless communication system, and more particularly, to a method and apparatus for transmitting and receiving a signal.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure provides a description related to a reference signal in a wireless communication system supporting a reduction in latency.

SUMMARY

An aspect of the present disclosure is to provide a method and apparatus for efficiently reporting a user equipment (UE) state and receiving a downlink signal or transmitting an uplink signal by a UE in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In an aspect of the present disclosure, a method of transmitting and receiving a signal, performed by a user equipment (UE) in a wireless communication system includes configuring a radio network temporary identity (RNTI) related to a modulation and coding scheme (MCS), receiving a control channel for scheduling transmission of an uplink data channel or reception of a downlink data channel, and transmitting the uplink data channel or receiving the downlink data channel based on one of a plurality of MCS tables, the uplink data channel or the downlink data channel being scheduled by the control channel. The one of the plurality of MCS tables is determined based on the RNTI related to the MCS and an RNTI related to the control channel.

In another aspect of the present disclosure, a UE for transmitting and receiving a signal, performed in a wireless communication system includes a transceiver and a processor configured to control the transceiver. The processor is configured to configure an RNTI related to an MCS, receive a control channel for scheduling transmission of an uplink data channel or reception of a downlink data channel by controlling the transceiver, and transmit the uplink data channel or receive the downlink data channel based on one of a plurality of MCS tables by controlling the transceiver, the uplink data channel or the downlink data channel being scheduled by the control channel. The one of the plurality of MCS tables is determined based on the RNTI related to the MCS and an RNTI related to the control channel.

In the method or apparatus, the one of the plurality of MCS tables may be determined based on information for a quadrature amplitude modulation (QAM) related to an MCS table to be used for the UE, received by higher-layer signaling.

In the method or apparatus, the RNTI related to the MCS may be an MCS-cell-RNTI (MCS-C-RNTI), and the one of the plurality of MCS tables may be determined based on the RNTI related to the control channel being the MCS-C-RNTI and the information for a QAM related to an MCS table to be used for the UE being for 256QAM or 64QAM or less.

In the method or apparatus, the UE may determine a modulation order and a target code rate to be used for reception of a physical downlink shared channel (PDSCH) based on an MCS field included in the control channel and the one of the plurality of MCS tables.

In the method or apparatus, the RNTI related to the control channel may be determined based on a block error rate (BLER).

In the method or apparatus, the one of the plurality of MCS tables may be determined in further consideration of at least one of a downlink control information (DCI) format of the control channel and/or further based on semi-persistent scheduling being configured for the uplink data channel or the downlink data channel.

In the method or apparatus, the UE may transmit UE capability information to a network. The UE capability information may include information for the number of updatable channel state information (CSI) processes for each combination of downlink and uplink transmission time interval (TTI) lengths.

In the method or apparatus, the information for the number of updatable CSI processes for each combination of downlink and uplink TTI lengths may include first information for the number of CSI processes based on the combination of downlink and uplink TTI lengths being a slot and a slot, second information for the number of CSI processes based on the combination of downlink and uplink TTI lengths being a subslot and a slot, third information for the number of CSI processes based on the combination of downlink and uplink TTI lengths being a subslot and a subslot and a first processing time being configured, and fourth information for the number of CSI processes based on the combination of downlink and uplink TTI lengths being a subslot and a subslot and a second processing time being configured.

It will be understood by those skilled in the art that the above-described aspects of the present disclosure are merely part of the embodiments of the present disclosure and various modifications and alternatives could be developed from the following technical features of the present disclosure.

According to an embodiment of the present disclosure, a user equipment (UE) state may be efficiently reported in consideration of a requirement for each channel, and a downlink signal may be received or an uplink signal may be transmitted accordingly.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1A:
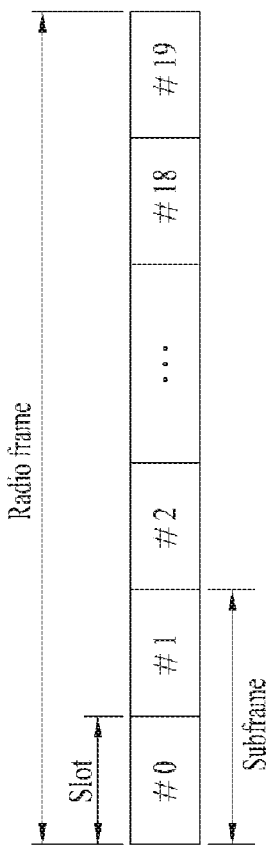
FIGS. 1A and 1B are diagrams for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'mobile station (MS)', 'mobile terminal (MT)', 'user terminal (UT)', 'subscriber station (SS)', 'wireless device', 'personal digital assistant (PDA)', 'wireless modem', 'handheld device', etc. A BS is typically a fixed station that communicates with a UE and/or another BS. The BS exchanges data and control information with a UE and another BS. The term 'BS' may be replaced with 'advanced base station (ABS)', 'Node B', 'evolved-Node B (eNB)', 'base transceiver system (BTS)', 'access point (AP)', 'processing server (PS)', etc. In the following description, BS is commonly called eNB.

In the present disclosure, a node refers to a fixed point capable of transmitting/receiving a radio signal to/from a UE by communication with the UE. Various eNBs may be used as nodes. For example, a node may be a BS, NB, eNB, pico-cell eNB (PeNB), home eNB (HeNB), relay, repeater, etc. Furthermore, a node may not be an eNB. For example, a node may be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB may be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes may be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system may be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes may control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes may be applied to various types of multi-node systems. For example, a node refers to an antenna group spaced apart from another node by a predetermined distance or more, in general. However, embodiments of the present disclosure, which will be described below, may even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an UL signal is called multi-eNB MIMO or coordinated multi-point Tx/Rx (CoMP). Coordinated transmission schemes from among CoMP communication schemes may be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments may be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability may be improved according to transmit diversity since the same stream is transmitted from/to plural nodes. DPS refers to a communication scheme by which a signal is transmitted/received through a node selected from plural nodes according to a specific rule. In the case of DPS, signal transmission reliability may be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE may measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements (Res) respectively carrying DL control information (DCI)/control format indicator (CFI)/acknowledgement/negative acknowledgement (DL ACK/NACK)/DL data. In addition, physical uplink control channel (PUCCH)/physical uplink shared channel (PUSCH)/physical random access channel (PRACH) refer to sets of time-frequency resources or REs respectively carrying uplink control information (UCI)/UL data/random access signals. In the present disclosure, a time-frequency resource or an RE, which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of UL control information/UL data/random access signal through or on PUCCH/PUSCH/PRACH. Furthermore, transmission of PDCCH/PCFICH/PHICH/PDSCH by an eNB is equivalent to transmission of DL data/control information through or on PDCCH/PCFICH/PHICH/PDSCH.

Figure 1B:
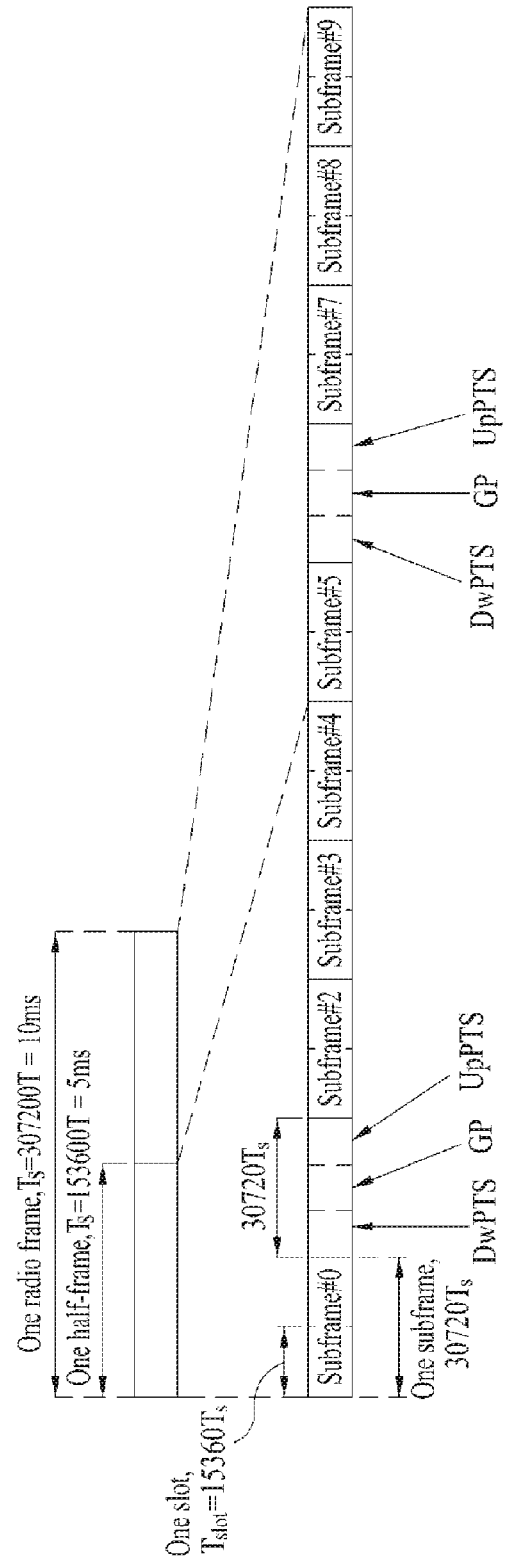

FIGS. 1A and 1B illustrate an exemplary radio frame structure used in a wireless communication system. FIG. 1A illustrates a frame structure for frequency division duplex (FDD) used in 3GPP LTE/LTE-A and FIG. 1B illustrates a frame structure for time division duplex (TDD) used in 3GPP LTE/LTE-A.

Referring to FIGS. 1A and 1B, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame may be sequentially numbered from 0 to 19. Each slot has a length of 0.5 ms. A time for transmitting a subframe is defined as a transmission time interval (TTI). Time resources may be discriminated by a radio frame number (or radio frame index), subframe number (or subframe index) and a slot number (or slot index).

The radio frame may be configured differently according to duplex mode. Downlink transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes an UL subframe and S denotes a special subframe. The special subframe includes three fields of DwPTS (Downlink Pilot Time Slot), GP (Guard Period), and UpPTS (Uplink Pilot Time Slot). DwPTS is a period reserved for DL transmission and UpPTS is a period reserved for UL transmission. Table 2 shows special subframe configuration.

TABLE 2

| | Normal cyclic prefix in downlink | | | Extended cyclic prefix in downlink | | |
|---|---|---|---|---|---|---|
| | DwPTS | UpPTS | | DwPTS | UpPTS | |
| Special subframe configuration | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | | |
| 9 | 13108 · $T_s$ | | | — | | |

Figure 2:
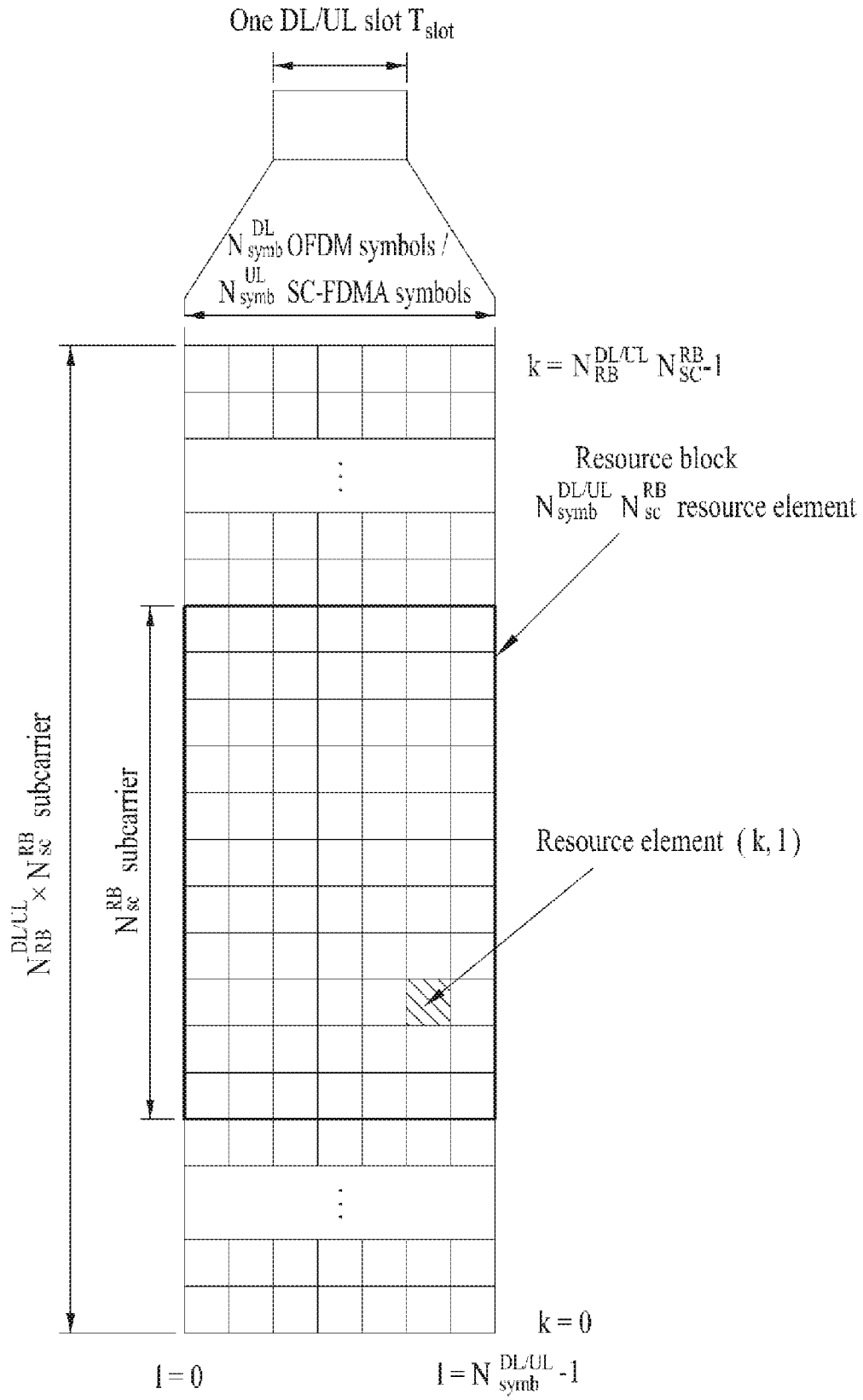
FIG. 2 is a diagram for an example of a downlink (DL)/uplink (UL) slot structure in a wireless communication system.

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure may be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types may be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called an RE or a tone. Accordingly, an RB is composed of $N_{symb}^{DL/UL} * N_{sc}^{RB}$ REs. Each RE in a resource grid may be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
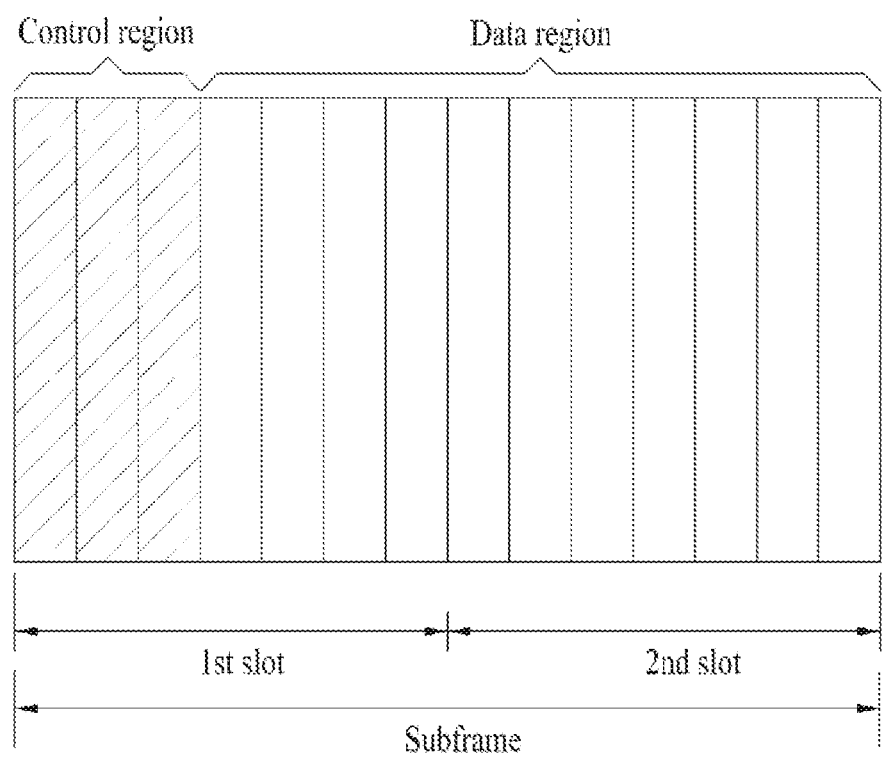
FIG. 3 is a diagram for an example of a DL subframe structure used in 3GPP LTE/LTE-A system.
Figure 3:

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a PDSCH is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DL control information (DCI). The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, the DCI format for a UE depends on the transmission mode (TM) configured for the UE. In other words, only a DCI format corresponding to a specific TM may be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH may be located for each UE. A CCE set from which a UE may detect a PDCCH thereof is called a PDCCH search space, simply, search space. An individual resource through which the PDCCH may be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 6 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space, and a UE monitors the search space to detect the PDCCH (DCI). Here, monitoring refers to attempting to decode each PDCCH in the corresponding search space according to all monitored DCI formats. The UE may detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB may transmit data for a UE or a UE group through the data region. Data transmitted through the data region may be called user data. For transmission of the user data, a PDSCH may be allocated to the data region. A PCH and DL-SCH are transmitted through the PDSCH. The UE may read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

An RS to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data may be used for demodulation only. For example, in 3GPP LTE(-A), CSI-RS corresponding to an additional RS for measurement is transmitted to the UE such that the UE may measure channel state information. CSI-RS is transmitted in each transmission period corresponding to a plurality of subframes based on the fact that channel state variation with time is not large, unlike CRS transmitted per subframe.

Figure 4:
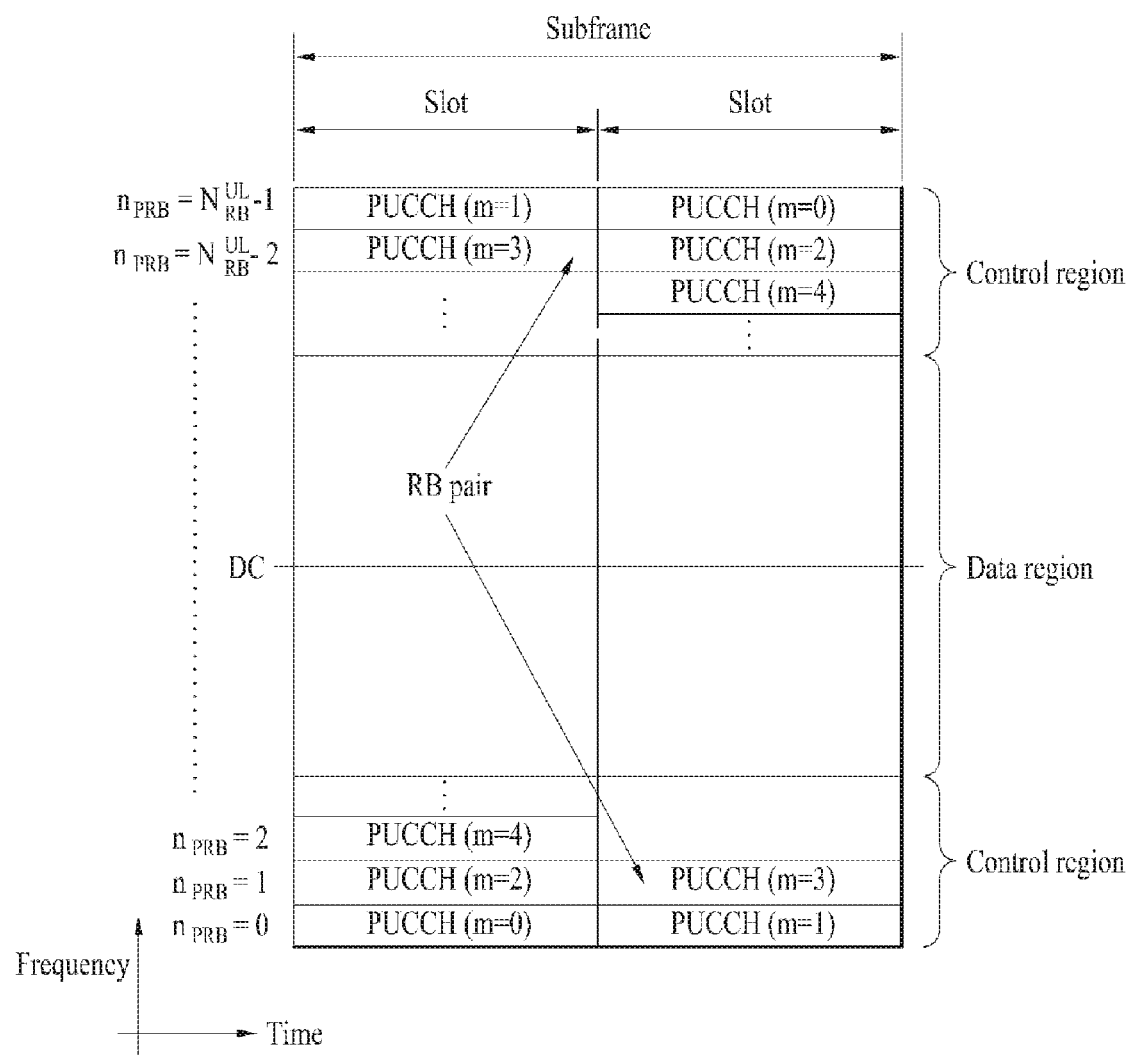
FIG. 4 is a diagram for an example of a UL subframe structure used in 3GPP LTE/LTE-A system.

FIG. 4 illustrates an exemplary UL subframe structure used in 3GPP LTE/LTE-A.

Referring to FIG. 4, a UL subframe may be divided into a control region and a data region in the frequency domain. One or more PUCCHs may be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH may be used to transmit the following control information.

Scheduling Request (SR): This is information used to request a UL-SCH resource and is transmitted using On-Off Keying (OOK) scheme HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Indicator (CSI): This is feedback information about a DL channel. Feedback information regarding MIMO includes a rank indicator (RI) and a precoding matrix indicator (PMI).

The quantity of control information (UCI) that a UE may transmit through a subframe depends on the number of single carrier frequency division multiple access (SC-FDMA) symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

PUCCH format 3 uses block spreading. Block spreading is a technique of multiplexing modulation symbol sequences obtained by modulating a multi-bit ACK/NACK by using block spreading codes. For block spreading, SC-FDMA may be used. SC-FDMA refers to a transmission scheme in which discrete Fourier transform (DFT) spreading (or fast Fourier transform (FFT)) is accompanied by inverse fast Fourier transform (IFFT).

In PUCCH format 3, a symbol sequence (e.g., an ACK/NACK symbol sequence) is spread in the time domain by a block spreading code, for transmission. A block spreading code may be an orthogonal cover code (OCC). Control signals from multiple UEs may be multiplexed by block spreading codes. Compared to PUCCH format 2 in which one symbol sequence is transmitted across a time area and UEs are multiplexed by using cyclic shifts (CSs) of a constant amplitude zero auto-correlation (CAZAC) sequence, a symbol sequence including one or more symbols is transmitted across a frequency area in each data symbol and UEs are multiplexed by spreading symbol sequences with block spreading codes in the time domain in PUCCH format 3.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver may receive a correct signal only when the receiver is aware of a channel state between each transmit antenna and each receive antenna. Accordingly, a reference signal needs to be provided per transmit antenna, more specifically, per antenna port.

Reference signals may be classified into an UL reference signal and a DL reference signal. In LTE, the UL reference signal includes:

i) a demodulation reference signal (DMRS) for channel estimation for coherent demodulation of information transmitted through a PUSCH and a PUCCH; and ii) a sounding reference signal (SRS) used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals may be classified into a reference signal for channel information acquisition and a reference signal for data demodulation. The former needs to be transmitted in a wide band as it is used for a UE to acquire channel information on DL transmission and received by a UE even if the UE does not receive DL data in a specific subframe. This reference signal is used even in a handover situation. The latter is transmitted along with a corresponding resource by an eNB when the eNB transmits a DL signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

Meanwhile, in the LTE-A system expected to include finer MU-MIMO and explicit CoMP operations, current CSI feedback is defined in LTE and cannot sufficiently support such operations to be newly employed. As the requirements for CSI feedback accuracy become complicated to obtain sufficient MU-MIMO or CoMP throughput gain, they agreed to configure PMI with two types of long term/wideband PMI ($W_1$) and short term/subband PMI ($W_2$). So to speak, final PMI is expressed as a function of $W_1$ and $W_2$. For example, final PMI W may be defined as follows: $W=W_1*W_2$ or $W=W_2*W_1$. Hence, in LTE-A, CSI shall be configured with RI, $W_1$, $W_2$ and CQI.

In the 3GPP LTE(-A) system, an UL channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical UL control channel (PUCCH). When needed by the scheduler, a physical UL shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 RI 1st wideband CQI(4bit) 2nd wideband CQI(4bit) if RI > 1 N*Subband PMI(4bit) (N is the total # of subbands) (if 8Tx Ant. N*subband W2 + wideband W1) |

TABLE 6-continued

| | | PMI Feedback Type | |
|---|---|---|---|
| | No PMI | Single PMI | Multiple PMI |
| UE Selected (subband CQI) | Mode 2.0<br>RI (only for Open-loop SM)<br>1st wideband CQI(4bit) + Best-M CQI(2bit)<br>(Best-M CQI: An average CQI for M SBs selected from among N SBs)<br>Best-M index (L bit) | | Mode 2-2<br>RI<br>1st wideband CQI(4bit) + Best-M CQI(2bit)<br>2nd wideband CQI(4bit) + Best-M CQI(2bit) if RI > 1<br>Best-M index (L bit)<br>Wideband PMI(4bit) + Best-M PMI(4bit)<br>(if 8Tx Ant. wideband W2 + Best-M W2 + wideband W1) |
| Higher Layer-configured (subband CQI) | Mode 3.0<br>RI fonlv for Open-loop SM)<br>1st wideband CQI(4bit) + N*subbandCQI(2bit) | Mode 3-1<br>RI<br>1st wideband CQI(4bit) + N*subbandCQI(2bit)<br>2nd wideband CQI(4bit) + N*subbandCQI(2bit) if RI > 1<br>Wideband PMI(4bit)<br>(if 8Tx Ant. wideband W2 + wideband W1) | Mode 3-2<br>RI<br>1st wideband CQI(4bit) + N*subbandCQI(2bit)<br>2nd wideband CQI(4bit) + N*subbandCQI(2bit) if RI > 1<br>N*Subband PMI(4bit)<br>(N is the total # of subbands)<br>(if 8Tx Ant. N*subband W2 + wideband W1) |

The transmission modes in Table 6 are selected in a higher layer, and the CQI/PMI/RI are all transmitted in a PUSCH subframe. Hereinafter, UL transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CRI (CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a 1 second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |

TABLE 9-continued

| Values of CSI request field | Description |
| --- | --- |
| '10' | Aperiodic CSI reporting is triggered for a first set of CSI processes configured by higher layer |
| '11' | Aperiodic CSI reporting is triggered for a second set of CSI processes configured by higher layer |

(Carrier Aggregation (CA)

CA is a technique of using one logical wide frequency band by aggregating a plurality of frequency blocks or (logical) cells, each including a UL resource (or UL component carrier (CC)) and/or a DL resource (or DL CC) by a UE, so that a wireless communication system may use a wider frequency band.

One DL CC and one UL CC are used in the LTE system, whereas a plurality of CCs are available in the LTE-A system. For data channel scheduling by a control channel, legacy linked carrier/self-carrier scheduling and cross-carrier scheduling (CCS) are available.

More specifically, in linked carrier/self-carrier scheduling, a control channel transmitted in a specific CC schedules only a data channel in the specific CC as in the legacy LTE system using a single CC.

In CCS, a control channel transmitted in a primary CC schedules a data channel transmitted in the primary CC or any other CC by means of a carrier indicator field (CIF).

Next-Generation LTE-A System

As more and more communication devices require a larger communication capacity, there is a need for enhanced mobile broadband communication (eMBB) beyond the legacy radio access technology (RAT) in a next-generation communication system under discussion. In addition, massive machine type communications (MTC) that provide a variety of services anywhere and anytime by interconnecting multiple devices and objects is one of important issues to be considered for next-generation communications. In consideration of services/UEs sensitive to reliability and latency, ultra-reliable and low latency communication (URLLC) is being discussed for the next-generation communication system.

In the next-generation system, various (lengths of) transmission time intervals (TTIs) may be configured for all or specific physical channels to satisfy the requirements of various application fields. In particular, a TTI in which a physical channel such as a PDCCH/PDSCH/PUSCH/PUCCH is transmitted may be set less than 1 msec to reduce communication latency between an eNB and a UE depending on scenarios (the PDCCH/PDSCH/PUSCH/PUCCH is referred to as a sPDCCH/sPDSCH/sPUSCH/sPUCCH).

For a single or multiple UEs, a plurality of physical channels may be present in one subframe (e.g., 1 msec), and each channel may have a different TTI (length). The following embodiments will be described based on the LTE system for convenience of description. In this case, a TTI may be set to 1 msec, which is the length of a normal subframe of the LTE system (such a TTI is referred to as a normal TTI). A short TTI means a TTI shorter than the normal TTI and includes one or multiple OFDM or SC-FDMA symbols. Although the present disclosure assumes the short TTI (i.e., a TTI shorter than one subframe) for convenience of description, the present disclosure may be extended and applied when the TTI is longer than one subframe or has a length equal to or longer than 1 ms. The present disclosure may also be extended and applied when the next-generation system introduces the short TTI by increasing the subcarrier spacing. Although the present disclosure is described based on the LTE system for convenience of description, the disclosure is also applicable to a technology that uses a different waveform/frame structure such as new radio access technology (RAT). In general, the present disclosure assumes the use of a sTTI (<1 msec), a long TTI (=1 msec), and a longer TTI (>1 msec). Although the following embodiments are described based on multiple UL channels having different TTI lengths, numerologies, and/or processing times, it is apparent that the embodiments are applicable to multiple UL/DL channels with different service requirements, latency, and/or scheduling units.

Figure 5:
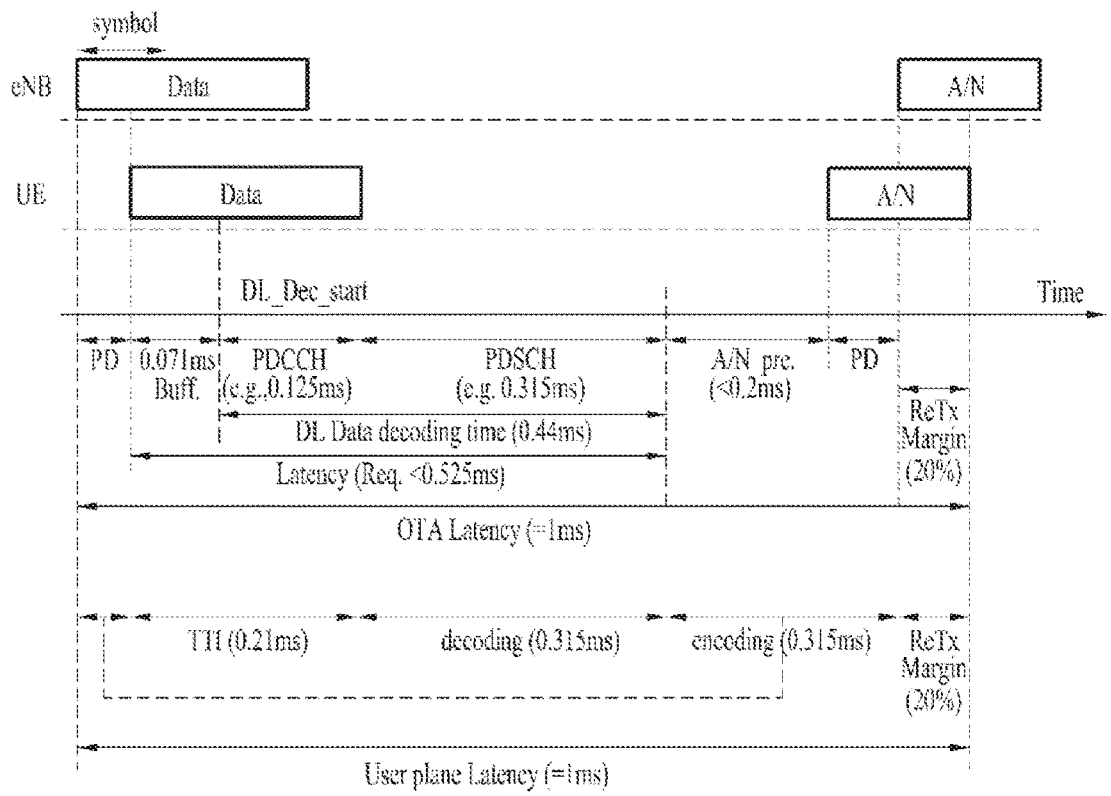
FIG. 5 illustrates a decrease in the length of a TTI according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
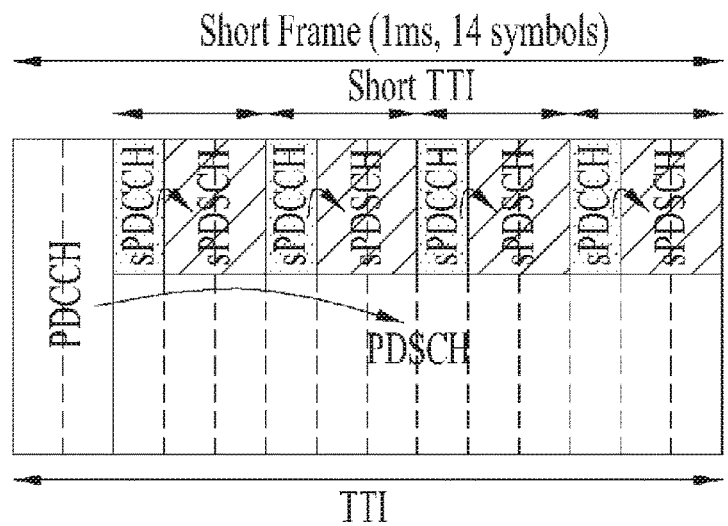
FIG. 6 illustrates an example of configuring a plurality of short TTIs in one subframe.

In a DL environment, a PDCCH for data transmission/scheduling within the sTTI (i.e., a sPDCCH) and a PDSCH for transmitting data within the sTTI (i.e., a sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting a sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In a UL environment, data may be transmitted/scheduled in the sTTI as in the DL case. In this case, channels corresponding to the PUCCH and the PUSCH, which are based on the normal TTI, may be referred to as sPUCCH' and sPUSCH', respectively.

Figure 7A:
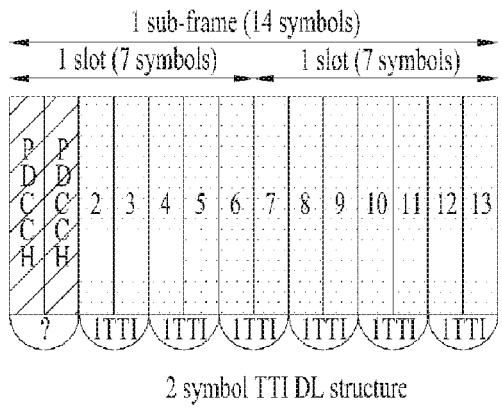
FIGS. 7A to 7D illustrates the structures of DL subframes including short TTIs of multiple lengths (various numbers of symbols)
Figure 7B:
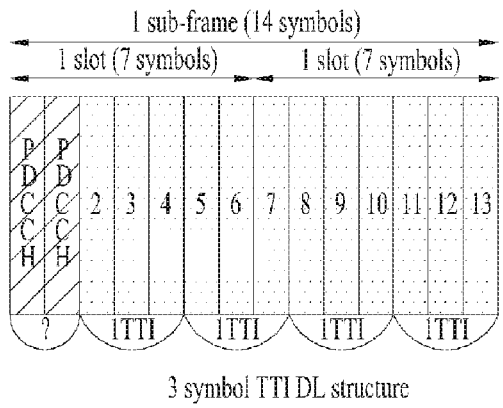
Figure 7C:
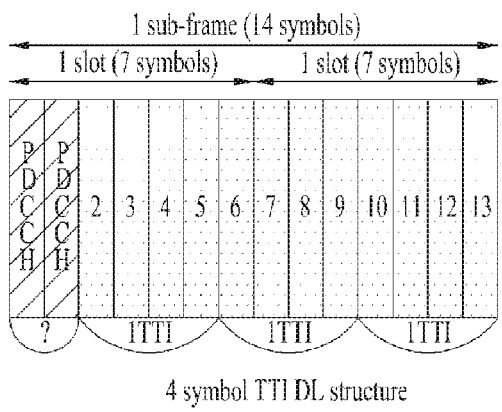

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIGS. 7A to 7D, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in FIG. 7A, if two symbols constitute one TTI unit, 6 TTIs may be generated. As illustrated in FIG. 7B, if 3 symbols constitute one TTI unit, 4 TTIs may be generated. As illustrated in FIG. 7C, if 4 symbols constitute one TTI unit, 3 TTIs may be generated. In this case, it is assumed that legacy PDCCHs are transmitted in the first starting two OFDM symbols.

Figure 7D:
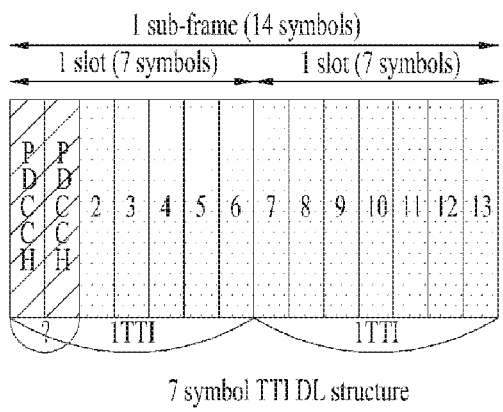

As illustrated in FIG. 7D, in the case in which 7 symbols constitute one TTI, 7 symbols including legacy PDCCHs may constitute one TTI and 7 subsequent symbols may constitute one TTI. If one TTI includes 7 symbols, a UE supporting a sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

Figure 8A:
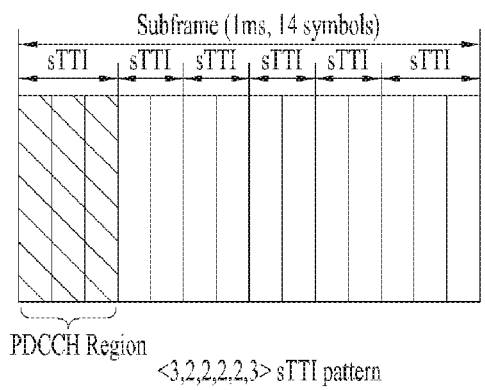
FIGS. 8A and 8B illustrate the structures of DL subframes including short TTIs of 2 and 3 symbols.
Figure 8B:
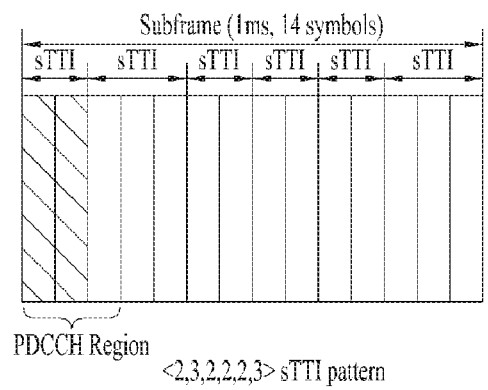

The present disclosure considers a sTTI structure in which a sTTI consisting of two OFDM symbols (OSs) and a sTTI consisting of three OSs coexist in one subframe as illustrated in FIGS. 8A and 8B. The sTTI consisting of two or three OSs may be simply defined as a two-symbol sTTI (or a two-OS sTTI). In addition, a two-symbol sTTI and a three-symbol sTTI may be referred to as a two-symbol TTI and a three-symbol TTI, respectively. It should be noted that each of the sTTIs is shorter than the legacy TTI, i.e., 1 ms TTI. That is, the term "TTI" used herein may indicate the sTTI as well. The object of the present disclosure is to provide a communication method in a system using a TTI shorter than the legacy TTI, irrespective of their names.

Herein, the numerology may refer to a TTI length or subcarrier spacing to be applied to a wireless communication system, a parameter indicating a fixed TTI length or fixed subcarrier spacing, a communication architecture or system based thereon.

In sTTI pattern <3,2,2,2,2,3> illustrated in FIG. 8A, the sPDCCH may be transmitted depending on the number of PDCCH symbols. In sTTI pattern <2,3,2,2,2,3> illustrated in FIG. 8B, it may be difficult to transmit the sPDCCH due to the legacy PDCCH region.

New Radio Technology (NR)

The structure, operations, or functions of the 3GPP LTE (-A) system have been described above. For NR, the structure, operations, or functions of the 3GPP LTE(-A) system may be modified to a certain extent or realized or configured in a different manner, which will be described in brief.

In the NR system, a DL transmission and a UL transmission are performed in 10-ms frames each including 10 subframes. Accordingly, one subframe is 1 ms long. Each frame is divided into two half-frames.

One subframe includes as many consecutive OFDM symbols as $N_{symb}^{subframe,\mu}(=N_{symb}^{slot} \times N_{slot}^{subframe,\mu})$ where $N_{symb}^{slot}$ represents the number of symbols per slot, $\mu$ represents an OFDM numerology, and $N_{slot}^{subframe,\mu}$ represents the number of slots per subframe with respect to $\mu$. In NR, multiple OFDM numerologies may be supported as listed in Table 10.

TABLE 10

| $\mu$ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In Table 10, $\Delta f$ represents a subcarrier spacing (SCS). $\mu$ and a cyclic prefix (CP) for a DL carrier bandwidth part (BWP) and $\mu$ and a CP for a UL carrier BWP may be configured for a UE by UL signaling.

Table 11 lists the number of symbols per slot, $N_{symb}^{slot}$, the number of slots per frame, $N_{slot}^{frame,\mu}$ and the number of slots per subframe, $N_{slot}^{subframe,\mu}$ for each SCS in a normal CP case.

TABLE 11

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 12 lists the number of symbols per slot, Nsymbslot, the number of slots per frame, Nslotframe,μ and the number of slots per subframe, Nslotsubframe,μ for each SCS in an extended CP case.

TABLE 12

| μ | $N_{symb}^{slot}$ | $N_{slot}^{frame,\mu}$ | $N_{slot}^{subframe,\mu}$ |
|---|---|---|---|
| 2 | 12 | 40 | 4 |

As such, the number of slots per subframe may vary according to an SCS in the NR system. Each of the OFDM symbols of each slot may correspond to one of DL (D), UL (U), and flexible (X). A DL transmission may take place in a D or X symbol, and a UL transmission may take place in a U or X symbol. Flexible resources (e.g., an X symbol) may also be referred to as reserved resources, other resources, or unknown resources.

In NR, one RB is defined by 12 subcarriers in the frequency domain. One RB may include multiple OFDM symbols. An RE is defined by one subcarrier by one OFDM symbol. Therefore, there are 12 REs in one OFDM symbol of one RB.

A carrier BWP may be defined as a set of contiguous PRBs. The term carrier BWP may also be referred to shortly as BWP. Up to four BWPs may be configured for a UE on each of UL and DL. Although multiple BWPs are configured, one BWP is activated during a given time period. However, when a supplementary UL (SUL) is configured for the UE, four more BWPs may be configured on the SUL, and one of the BWPs may be activated during a given time period. The UE does not expect to receive a PDSCH, a PDCCH, a CSI-RS, or a tracking reference signal (TRS) outside the activated DL BWP. Further, the UE does not expect to receive a PUSCH or a PUCCH outside the activated UL BWP.

Figure 9:
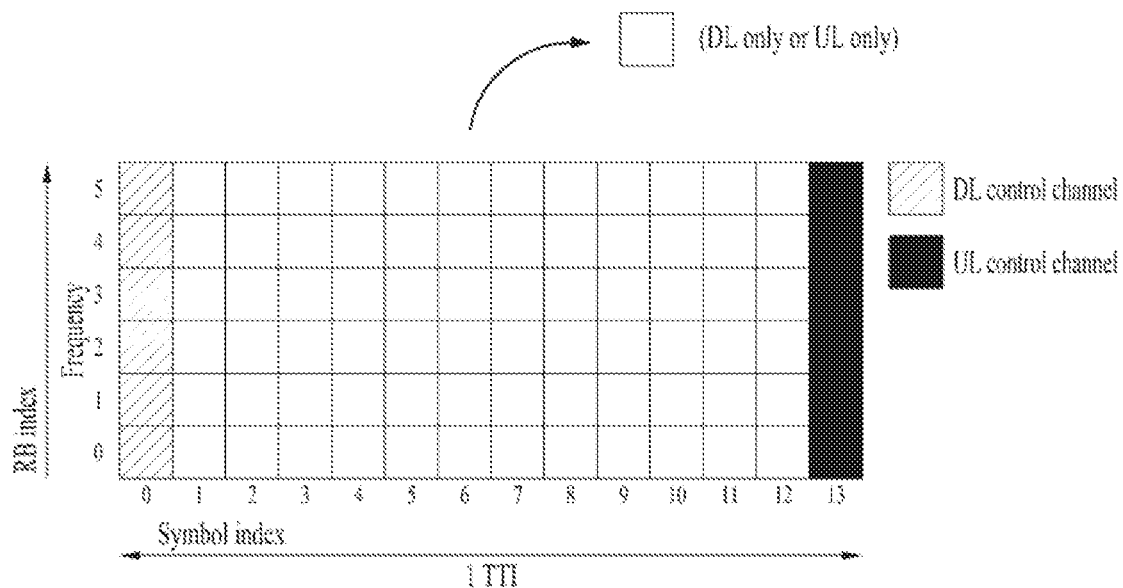
FIG. 9 is a diagram illustrating a self-contained subframe structure applicable to the present disclosure.

FIG. 9 is a diagram illustrating a self-contained subframe structure applicable to the present disclosure.

In FIG. 9, the hatched area (e.g., symbol index=0) represents a DL control region, and the black area (e.g., symbol index=13) represents a UL control region. The other area (e.g., symbol index=1 to 12) may be used for DL or UL data transmission.

Based on the self-contained slot structure, a BS and a UE may sequentially perform DL transmission and UL transmission in one slot. That is, the BS and the UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and the UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIGS. 7A to 7D.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

The next-generation system aims to use wide frequency bands and support various services or requirements. For example, URLLC, which is one of the representative scenarios regarding 3GPP NR requirements, requires low latency and high reliability. Specifically, the URLLC requires that that user plane latency of 0.5 ms is supported and X-byte data is transmitted within 1 ms with an error rate less than 10^-5. Generally, the traffic volume of eMBB is high, but the file size of URLLC traffic is less than tens or hundreds of bytes and sporadically occurs. Thus, for the eMBB, a transmission method capable of maximizing the transfer rate and minimizing the overhead of control information is required, but for the URLLC, a transmission method capable of using a short scheduling time unit and guaranteeing reliability is required.

Depending on application fields or traffic types, various reference time units may be assumed/used to transmit and receive a physical channel. The reference time unit may be a basic unit for scheduling a specific physical channel and vary depending on the number of symbols included in a corresponding scheduling unit and/or subcarrier spacing. In embodiments of the present disclosure, a slot or a mini-slot is used as the reference time unit for convenience of description. The slot may refer to a basic scheduling unit used for normal data traffic (e.g., eMBB). The time duration of the mini-slot may be shorter than that of the slot in the time domain. The mini-slot may refer to a basic scheduling unit used for special traffic or communication (e.g., URLLC, unlicensed band, millimeter wave, etc.). However, this is merely exemplary, and it is apparent that the present disclosure may be extended and applied when a physical channel is transmitted and received based on the mini-slot in the eMBB or when a physical channel is transmitted and received based on the slot in the URLLC or other communication methods.

Fast CSI Reporting

To support more strict reliability and latency requirements, CSI feedback needs to become faster and more accurate. That is, fast and accurate CSI feedback may allow a network to efficiently schedule a UE. To this end, it may be regulated that the UE transmits a CSI report on a specific cell and/or CSI process earlier than a conventional CSI report, which is based on a CSI request in a UL grant. In particular, a different service type and/or block error rate (BLER) requirement may be configured for each cell and/or CSI process. In addition, it may be regulated that CSI feedback for a specific service type and/or BLER requirement is provided at a timing different from a UL-SCH transmission timing scheduled by the UL grant (for example, at a timing earlier than that of the conventional CSI report based on the CSI request in the UL grant). In the present specification, "fast CSI reporting" means that CSI is reported at a timing earlier than that defined in the related art.

It may be regulated that PUSCH transmission for fast CSI reporting is performed at a timing different from the UL-SCH transmission timing scheduled by the UL grant. In particular, when multiple PUSCHs are transmitted based on the corresponding UL grant, one may be 'A-CSI only PUSCH' transmission and another may be PUSCH with UL-SCH' transmission. The A-CSI only PUSCH transmission refers to PUSCH transmission including only A-CSI, and the PUSCH with UL-SCH transmission refers to PUSCH transmission including a UL-SCH depending on a UL grant (i.e., normal PUSCH transmission). For example, assuming that the timing of the UL-grant-to-PUSCH with UL-SCH transmission is x subframes (or slots) and the timing of the A-CSI only PUSCH transmission from the UL grant is y subframes (or slots), y may be less than x (y<x). Alternatively, it may be regulated that the fast CSI reporting is enabled only when the condition for the A-CSI only PUSCH transmission is satisfied.

The fast CSI reporting may be performed on the PUSCH or a channel such as the PUCCH. Which channel is used for the fast CSI reporting may be configured by a higher layer signal or indicated by DCI. When the PUSCH is used for the fast CSI reporting, RB allocation may follow resource allocation indicated by UL grant DCI. However, in this case, if many resources are allocated for UL-SCH scheduling, the same amount of resources are used for the fast CSI reporting, and it may cause excessive resource waste. Accordingly, some resources in the resource allocation indicated by the UL grant DCI may be used for the fast CSI reporting. For example, it may be regulated that the fast CSI reporting is performed using a specific number of RBs, which are predefined/preconfigured, configured by the higher layer signal, or indicated by the DCI, from an RB with the lowest (or highest) RB index among allocated resources. As another example, it may be regulated that the fast CSI reporting is performed using resources corresponding to a starting RB index and length, which are predefined/preconfigured, configured by the higher layer signal, or indicated by the DCI. As another method, separate resources for the fast CSI reporting may be configured by the higher layer signal or indicated by the DCI. As a further method, if a PUSCH scheduled by the previous UL grant is present at the timing of the fast CSI reporting, it may be piggybacked on the corresponding PUSCH. In this case, if the corresponding PUSCH includes CSI triggered by the previous UL grant, it may be regulated that only the CSI corresponding to the fast CSI reporting is transmitted by overriding the CSI triggered by the previous UL grant.

When the PUSCH is used for the fast CSI reporting, an MCS indicated by the UL grant DCI may be used. However, to increase the reliability of CSI transmission, it may be regulated that a predetermined modulation order (e.g., QPSK) is used for the fast CSI reporting.

When the fast CSI reporting is triggered by the CSI request, it may be regulated that the PUCCH is used for the fast CSI reporting. To this end, a PUCCH resource for the fast CSI reporting may be configured by the higher layer signal or indicated by the CSI request. In particular, a specific PUCCH resource may be linked to a specific field in the CSI request. If there is another PUCCH for different UCI at the timing of the fast CSI reporting, aggregation may be performed on the PUCCH, and in this case, format adaptation may be defined. For example, if the timing of HARQ-ACK based on PUCCH format 1 collides with the transmission timing of the fast CSI reporting, it may be regulated that PUCCH format 3, 4, or 5 or a new PUCCH format (capable of supporting a large payload) is used for the format adaptation.

It may be regulated that the fast CSI reporting is performed only in the case of a CSI report on a cell or CSI process with a specific target BLER, a specific service type (e.g., URLLC), a specific TTI length, and/or a specific numerology. In particular, when the CSI request is transmitted, the target BLER, service type, TTI length, and/or numerology may be linked to each state in the CSI request, and the CSI reporting timing may be determined for each state. As another method, the reporting timing for each state may be explicitly indicated by the higher layer signal or implicitly mapped so that the CSI reporting timing may be determined for each state. As a further method, it may be regulated that the target BLER, service type, TTI length, and/or numerology is linked to each cell and/or CSI process, and each cell and/or CSI process has a different reporting timing. For example, assuming that the timing of the UL-grant-to-PUSCH with UL-SCH transmission is four subframes (or slots) and the timing of the A-CSI only PUSCH transmission is two subframes (or slots), if CSI processes a, b, and c, which correspond to specific states of CSI request bits, have BLER requirements of $10^{-1}$, $10^{-1}$, and $10^{-5}$, respectively, the UE may report CSI process c after two subframes (or slots) from when receiving the UL grant DCI including the CSI request and report CSI processes a and b after four subframes (or slots).

The timing of a reference resource for performing measurement for the fast CSI reporting or the CSI reporting for the cell or CSI process with the specific target BLER, the specific service type (e.g., URLLC), the specific TTI length, and/or the specific numerology may be defined to be different from that of a conventional reference resource (the former may be shorter than the latter). In general, a CSI reference resource for the cell or CSI process with the specific target BLER, the specific service type (e.g., URLLC), the specific TTI length, and/or the specific numerology may have a different timing from the conventional one (it may have a shorter timing than the conventional one). The timing of the CSI reference resource may be linked to each state in the CSI request, configured by the higher layer signal, or indicated by the DCI. Alternatively, the timing of the CSI reference resource may be linked to each cell and/or CSI process, configured by the higher layer signal, or indicated by the DCI.

A TTI length (i.e., scheduling unit size) and/or a numerology used as a reference for PDSCH CQI calculation on the reference resource on which the measurement for the fast CSI reporting or the CSI reporting for the cell or CSI process with the specific target BLER, the specific service type (e.g., URLLC), the specific TTI length, and/or the specific numerology is performed may be configured independently of those for normal CSI reporting. In addition, an RS (e.g., a CSI-RS different from that for the normal CSI reporting, a CSI-RS resource index, a CSI-RS+DMRS, and/or a DMRS only) used as the reference for the PDSCH CQI calculation on the reference resource on which the measurement for the fast CSI reporting is performed may be configured independently of those of the normal CSI reporting.

When the target BLER, service type (e.g., URLLC), TTI length, and/or numerology of CSI feedback on a specific cell or CSI process varies, the content of the corresponding CSI feedback may also vary. In particular, it may be regulated that some of the content of a CSI reporting mode configured for the corresponding cell/CSI process is reported. For example, the UE may report only an RI or a specific subband CQI/PMI. As another method, it may be regulated that only the content of a (predefined or signaled) compact mode (e.g., a wideband report, mode 1-0 or 1-1, etc.) is reported instead of following the CSI reporting mode configured for the corresponding cell/CSI process. The CSI reporting mode of the corresponding cell/CSI process or the content (set) to be actually transmitted in the corresponding cell/CSI process may be linked to a CSI request field in the DCI or a field equivalent thereto, and the UE may determine the content of the CSI reporting based thereon. As a further method, the target BLER, service type (e.g., URLLC), TTI length, and/or numerology may be interpreted differently for the same CSI reporting mode. More specifically, the content set of the CSI reporting mode, the subband size, the number of pieces of actually reported subband CSI, and/or the bit field size of each content may vary.

CSI Update/Calculation Capability

To support an operation of triggering/reporting a suitable amount of CSI feedback, the UE may need to report its maximum simultaneous CSI update/calculation capability to the network. In particular, it may be regulated that the UE reports to the network the maximum simultaneous CSI update/calculation capability for each target BLER, service type, TTI length, numerology, and/or processing time or for each combination thereof, using the number of cells or CSI processes. Alternatively, it may be regulated that the UE reports to the network the capability for the maximum number of simultaneously reported CSI reports for each target BLER, service type, TTI length, numerology, and/or processing time or for each combination thereof. The above capability signaling may be defined differently and independently per band or per band combination. The UE is not required to update cells or CSI processes over the maximum simultaneous CSI update/calculation capability. In other words, the UE may update cells and CSI processes within the maximum simultaneous CSI update/calculation capability.

It may be regulated that a CSI report on a cell or CSI process with a specific target BLER, a specific service type (e.g., URLLC), a specific TTI length, a specific numerology, and/or a specific processing time is prioritized and updated first. In particular, it may be regulated a CSI report on a cell or CSI process with a low BLER, a strict service/latency requirement, a short TTI length, a large subcarrier spacing, and/or a short processing time is prioritized and updated first. The above operation may be applied such that when multiple CSI reports have the same triggering time or when the triggering time of a CSI report with a high priority is later than that of a CSI report with a low priority, the CSI report with the high priority is updated first. In addition, the operation may be applied such that when multiple CSI reports have the same reporting time or when the reporting time of a CSI report with a high priority is later than that of a CSI report with a low priority, the CSI report with the high priority is updated first.

UE Capability on Maximum CSI Processes

Currently, UE capability signaling for indicating the maximum number of CSI processes supportable by the UE configured with transmission mode (TM) 10 has been defined for each component carrier of a specific band. When faster CSI reporting corresponding to sTTI operation is applied, the processing time from CSI measurement to CSI reporting may be different from that of the conventional 1 ms-TTI operation. Thus, it may be regulated that when the UE configured with TM 10 intends to report its capability i.e., the maximum number of CSI processes supportable by the UE for each component carrier of the specific band, the UE reports the maximum number of CSI processes independently for each target BLER, service type, numerology, TTI length, combination of DL and UL TTI lengths, and/or processing time or for each combination thereof. In addition, the UE capability signaling may be reported independently per band or per band combination.

When the network or eNB configures CSI processes for corresponding component carriers of a corresponding band, the network or eNB may recognize the maximum number of configurable CSI processes for the 1 ms TTI and/or sTTI and then configure the CSI processes based thereon.

CSI Feedback when TM is Changed Depending on Subframe Types (MBSFN or Non-MBSFN)

It has been considered that a TTI shorter than a subframe is supported. With the introduction of such a sTTI, a method of changing the TM of a PDSCH transmitted in the sTTI in a subframe depending on subframe types has also been discussed. For example, a method of configuring a DMRS-based TM for an MBSFN subframe, which is different from the TM configured for a non-MBSFN subframe, is under discussion. The present disclosure proposes the following CSI feedback methods on the assumption that the above operation is supported.

According to the current LTE standards, a CSI reporting mode may be determined based on the TM configured for the UE. In particular, when the DMRS-based TM, which is different from the TM configured for the non-MBSFN subframe, is independently configured for the MBSFN subframe, it may be regulated that CSI reporting modes are configured for the corresponding TMs, respectively. In this case, the CSI reporting mode may be determined according to the following methods.

(Method 1) It may be regulated that a CSI reporting mode corresponding to a TM determined depending on the type (MBSFN or non-MBSFN) of a subframe including a sTTI in which UL grant DCI for triggering CSI is transmitted is used in reporting the corresponding CSI.

(Method 2) It may be regulated that a CSI reporting mode corresponding to a TM determined depending on the type of a subframe including a sTTI for reporting CSI is used in reporting the corresponding CSI.

(Method 3) It may be regulated that a CSI reporting mode corresponding to the TM configured for the non-MBSFN subframe or a default TM is always used.

(Method 4) When aperiodic CSI is triggered, the CSI reporting mode may be explicitly indicated. Alternatively, it may be regulated that a CSI reporting mode implicitly associated with each state indicated by CSI request bits is used in reporting the corresponding CSI.

When the DMRS-based TM, which is different from the TM configured for the non-MBSFN subframe, is independently configured for the MBSFN subframe, if the sTTI for transmitting the UL grant DCI for triggering the CSI and the sTTI for reporting the CSI belong to different types of subframes (MBSFN or non-MBSFN), a CSI reference resource may be determined except a sTTI having a TM different from that when the CSI is reported.

Aperiodic CSI without UL-SCH for URLLC

According to the current LTE standards, when the conditions described in [Reference] are satisfied, the UE may provide only aperiodic CSI feedback that is triggered with no transport block (TB) for the UL-SCH. For convenience of description, transmitting UCI with no UL-SCH over the PUSCH is referred to as UCI only PUSCH feedback.

[Reference] Conditions for aperiodic CSI reporting with no UL-SCH

"When DCI format 0 is used and I_MCS=29 or when DCI format 4 is used, only one TB is enabled, I_MCS=29 in the corresponding TB, and the number of transmission layers is 1, If the CSI request bit field is one bit, aperiodic CSI reporting is triggered, and N_PRB is less than or equal to 4, If the CSI request bit filed is two bits, aperiodic CSI reporting is triggered for one serving cell, N_PRB is less than or equal to 4, If the CSI request bit filed is two bits, aperiodic CSI reporting is triggered for multiple serving cells, N_PRB is less than or equal to 20, If the CSI request bit filed is two bits, aperiodic CSI reporting is triggered for one CSI process, N_PRB is less than or equal to 4, or If the CSI request bit filed is two bits, aperiodic CSI reporting is triggered for multiple CSI processes, N_PRB is less than or equal to 20,"

If time repetition is applied to PUSCH transmission, the conditions for triggering CSI reporting on the PUSCH with no UL-SCH need to be changed. Specifically, it may be regulated that the conditions for triggering the CSI reporting on the PUSCH with no UL-SCH are determined by considering the MCS index and/or the number of repetitions applied to the corresponding PUSCH besides N_PRB. For example, when the number of PUSCH repetitions is set to 2 and then indicated to the UE, it may be regulated that the UE needs to recognize "upper limit value of N_PRB*repetition number" in the conditions for triggering the CSI reporting on the PUSCH with no UL-SCH as the upper limit value of new N_PRB and then determine whether the CSI reporting on the PUSCH with no UL-SCH is triggered based thereon.

UCI Feedback with Time Repetition

To improve the reliability of UL channel transmission, the time repetition may be considered. In this case, it is expected that the time repetition may also increase the reliability of UCI feedback, which is transmitted together with the UL channel. However, if the time repetition is applied to the UCI feedback as many times as the number of times that the PUSCH carrying the UCI feedback is repeated, it may be inefficient in terms of latency. Therefore, the present disclosure propose the following options. Here, UCI may include not only CSI but also HARQ-ACK, SR, etc.

Option 1: The time repetition may be applied to the UCI feedback as many times as the time repetition number of the PUSCH.

Option 2: The time repetition may be applied to the UCI feedback fewer times than the time repetition number of the PUSCH. In this case, the time repetition number of the UCI feedback may be predefined independently of the time repetition number of the PUSCH, configured by the higher layer signal, or indicated by the physical layer signal. In addition, information indicating which PUSCH among PUSCHs to which the time repetition is applied is included and transmitted in the UCI feedback may be predefined, configured by the higher layer signal, or indicated by the physical layer signal. Moreover, the UCI may be mapped to the same number of REs in every repetition. In this case, the UCI mapping order may be determined such that all the repetitions are distributed in the time domain.

As another method, the number of REs to which the UCI is mapped may vary in each repetition. For example, the number of REs to which the UCI is mapped may be determined such that if the number of REs exceeds a certain level, increasing from the first repetition, the UCI is mapped to the next repetition (or subframe/TTI).

According to the LTE standards, when the UCI is transmitted on the PUSCH, the number of coded symbols (i.e., REs in the LTE standards) for corresponding UCI transmission is calculated. In particular, when the CSI is transmitted over the PUSCH, the calculation may be performed as follows.

[Reference 1]

For channel quality control information (CQI and/or PMI denoted as CQI/PMI);

When the UE transmits channel quality control information bits, it shall determine the number of modulation coded symbols per layer Q' for channel quality information as $$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

where
O is the number of CQI/PMI bits, and
L is the number of CRC bits given by $$L = \begin{cases} 0 & O \leq 11 \\ 8 & \text{otherwise} \end{cases},$$

and

[Reference 2]

$Q_{CQI} = Q_m^{(x)} \cdot Q'$ and $\beta_{offset}^{PUSCH} = \beta_{offset}^{CQI}$, where $\beta_{offset}^{CQI}$ shall be determined according to [3] depending on the number of transmission codewords for the corresponding PUSCH, the duration of the corresponding PUSCH, and on the uplink power control subframe set for the corresponding PUSCH when two uplink power control subframe sets are configured by higher layers for the cell.

If neither RI nor CRI is not transmitted then $Q_{RI}^{(x)}=0$.

That is, when the number of coded symbols (or REs) for UCI transmission in each repetition is calculated under the application of the PUSCH time repetition, the following issues may be considered for the beta offset ($\beta_{offset}^{PUSCH} = \beta_{offset}^{CQI}$).

Option 3: When the time repetition is applied to the PUSCH, it may be regulated that the UCI feedback is transmitted using a large number of REs in the TTI for one PUSCH (or some PUSCHs) among repeatedly transmitted PUSCHs by applying a beta offset value higher than the previously configured/indicated value. In this case, it may be regulated that the UCI feedback is transmitted using a large number of REs in the TTI for one PUSCH (or some PUSCHs) among repeatedly transmitted PUSCHs. The beta offset value may be independent (changed) for each time repetition number (group). In addition, the beta offset value may be configured by the higher layer signal or indicated by the physical layer signal. As another method, the number of coded symbols or REs for the PUSCH may be determined by multiplying the PUSCH repetition number with the previously configured or indicated beta offset value.

Option 4: When the time repetition is applied to the PUSCH, it may be predefined, configured by the higher layer signal, or indicated by the physical layer signal whether the time repetition is applied to the UCI feedback or whether a large number of REs are used in the TTI for one PUSCH (or some PUSCHs) by applying a high beta offset value.

CQI Table for Different Requirements

In a legacy communication system, a CQI report is calculated based on a BLER requirement of $10^{-1}$. To support a different requirement (e.g., a BLER lower than $10^{-1}$) from the legacy BLER requirement, a new CQI deriving method may be needed. For example, when there is any channel requiring a BLER lower than $10^{-1}$, a CQI table related to the channel may be different from a CQI table having a BLER requirement of $10^{-1}$.

Each channel may have a channel-specific requirement. The requirement may be related to one or more of a service type, quality of service (QoS), a target BLER, transmission reliability, a transmission latency, a TTI length, a numerology, and a processing time. One or more requirements may be considered or configured for a specific channel. When a UE or an eNB is configured with a plurality of channels, each of the channels may have a different requirement.

A CQI table may be defined separately for each of other requirements as well as a BLER requirement. Alternatively, one or more requirements may be grouped and a CQI table may be defined for each group. A different CQI table may be laid out according to the type of a requirement or the type of a group of requirements. Further, as described before in relation to a BLER, a CQI table may be laid out differently according to how strict a requirement is. Now, a detailed description will be given of a CQI table from which a UE is to derive a CQI report.

In consideration of one or more of a CSI link configuration, a CSI measurement configuration, and a CSI reporting configuration, a CQI table may be configured for each of the configurations for a UE. For example, one or more of the CSI link configuration, the CSI measurement configuration, and the CSI reporting configuration may be configured for each of the afore-described requirements. CQI tables may then be determined, for mapping to the configured one or more of the CSI link configuration, the CSI measurement configuration, and the CSI reporting configuration. For example, when CSI is reported respectively for URLLC and eMBB, a CQI table for URLLC may be determined differently from a CQI table for eMBB.

Alternatively, one or more CQI tables may be configured UE-specifically for the UE. The UE may be configured with a CQI table, CQI table 2 in addition to a default CQI table, CQI table 1, and transmit both of information about a CQI index in the default CQI table and a CQI index in the additional CQI table, at each CSI feedback. For example, when CQI index a is derived from CQI table 1 and CQI index b is derived from CQI table 2, the UE may transmit CQI index a and CQI index b as a CSI feedback to the network. Instead of transmitting CQI index b itself, the UE may represent CQI index b by an offset (a CQI offset) from CQI index a or information corresponding to the offset and transmit the offset or the information. This may be similar to increasing delta values A together for different CQI tables at all times in calculating/reporting CSI for a wideband/subband.

Alternatively, the UE may transmit information about a CQI table to be used by the UE in UCI. When transmitting a CSI feedback (in which a CQI may be included), the UE may select a value indicating the CQI table and transmit the selected value. The value indicating the CQI table may be transmitted along with the CQI. Alternatively, the value indicating the CQI table may be transmitted separately from the CQI in a longer time unit than that of the CQI.

Alternatively, one or more of a different DCI format and/or a different search space may be defined for each requirement. When requirements are grouped, one or more of a different DCI format and/or a different search space may be defined for each group of requirements. A CQI table to be used by the UE may be determined based on the DCI format and/or search space of a received control channel.

Alternatively, a different RNTI may be assigned to the UE, for each requirement. When requirements are grouped, a different RNTI may be assigned to the UE, for each group of requirements. The UE may identify an RNTI by which the CRC of a received channel has been masked and determine a CQI table to be used based on the RNTI.

Alternatively, each requirement may be linked to a CQI request bit. When requirements are grouped, a CSI request bit may be linked to each group of requirements. The UE may determine a CQI table to be used based on a received CSI request bit.

Alternatively, there may be a difference between the number of bits (e.g., X bits) in the CRC of a control channel that triggers a CSI transmission or schedules a channel for the CSI transmission and the number of bits in a UE ID (e.g., a Y-bit RNTI). When the number of bits in the UE ID is less than the number of the CRC bits (e.g., X>Y), all or a part of as many bits as the difference (X-Y) may be used to indicate a CQI table to be used by the UE. Alternatively, all or a part of as many bits as the difference may be used to indicate a CQI offset. All or a part of as many bits as the difference may be used to indicate both of the CQI offset and the CQI table to be used by the UE.

A similar operation may be performed in reporting a PMI and an RI as well as a CQI. For each requirement, a PMI may be calculated separately. The calculated PMIs may be reported together or in the form of PMI offsets. For each requirement, an RI may be calculated separately. The calculated RIs may be reported together or in the form of RI offsets.

CSI Reference Resources for Different Requirements

The UE may receive PDSCHs for different time durations. A scheduling unit for one or more PDSCHs configured/indicated by control information may be a slot, a mini-slot, or a plurality of slots. The time duration of data reception may start in the first symbol or any other specific symbol of a slot within a transmission unit. Because the time duration of data reception may vary, there may be a need for defining the time duration and overhead of an RS that the UE will assume in calculating a CQI.

In CQI calculation, a CSI reference resource may vary according to the scheduling unit and/or time duration of a PDSCH. Each scheduling unit and/or time duration may be linked to a CQI table. Considering that the scheduling unit and/or time duration of data is not fixed, the UE may be preconfigured with or receive, by higher-layer signaling, information about the starting symbol, ending symbol, time duration (e.g., in symbols, mini-slots, or slots), and/or rate-matching pattern of an RS.

Alternatively, for each CQI table, a CQI reference resource may be configured/indicated UE-specifically.

Alternatively, a CSI reference resource to be assumed by the UE may be defined based on a DCI format and/or a search space. As described before, one or more of a different DCI format and/or a different search space may be defined for each requirement. When requirements are grouped, one or more of a different DCI format and/or a different search space may be defined for each group of requirements. A CQI table to be assumed by the UE may vary according to the DCI format and/or search space of a received control channel.

Alternatively, a different CSI reference resource may be determined/defined for each requirement. When requirements are grouped, a different CSI reference resource may be determined/defined for each group of requirements. For example, given a target BLER of 10%, it may be determined/defined that the CSI reference resource is located in a TTI earlier than a CSI reporting time by n_{CQI_ref} TTIs or at the time of a valid TTI which is closest to the TTI earlier than the CSI reporting time by n_{CQI_ref} TTIs before the TTI earlier than the CSI reporting time by n_{CQI_ref} TTIs. When a target BLER is 0.001%, it may be determined/defined that the CSI reference resource is located in a TTI earlier than a CSI reporting time by k TTIs or at the time of a valid TTI which is closest to the TTI earlier than the CSI reporting time by k TTIs before the TTI earlier than the CSI reporting time by k TTIs, where k is a value less than n_{CQI_ref}, preconfigured for the UE or received via a physical layer or a higher layer by the UE. The UE may report CSI reflecting the latest CSI measurement result, for a stricter BLER requirement.

There may be a need for defining a timing at which a CSI-RS is determined to be located. The difference between a CSI feedback time and a time at which a CSI reference resource is located may be derived in consideration of the following.

A plurality of timing sets may be preconfigured for the UE and which timing set to be used may be indicated dynamically to the UE. For example, a first timing set may be defined as one of a valid TTI, slot, mini-slot, and symbols which are located before a time earlier than the CSI feedback time by X symbols and closest to the time earlier than the CSI feedback time by X symbols. A second timing set may be defined as one of a valid TTI, slot, mini-slot, and symbols which are located before a time earlier than the CSI feedback time by X slots and closest to the time earlier than the CSI feedback time by X slots. A valid TTI, slot, mini-slot, or symbols may refer to a TTI, slot, mini-slot, or symbols including a CSI-RS (or any other RS in which the UE is to measure CSI). The first timing set may be used for non-slot-based scheduling, and the second timing set may be used for slot-based scheduling. Alternatively, each requirement may be linked to a specific timing set. When requirements are grouped, each group of requirements may be linked to a specific timing set. Information about the linkage may be preconfigured for the UE or indicated to the UE by physical-layer signaling or higher-layer signaling. In aperiodic CSI reporting, information about a timing set may be linked to an RRC configuration and/or a DCI indication. In aperiodic CSI reporting, an RRC configuration and/or a DCI indication may indicate a timing set.

Alternatively, a CSI reference resource may be a slot, a mini-slot, or symbols including DCI that triggers a CSI transmission. The CSI reference resource may be a plurality of symbols a predetermined time after the DCI that triggers the CSI transmission. Information about the predetermined time may be predefined for the UE or indicated to the UE by physical-layer signaling or higher-layer signaling.

MCSs/TBSs for Different Requirements

To support different requirements, a plurality of MCS tables may be configured for the UE. Which one of the MCS tables the UE is to use may be indicated.

A different MCS table may be configured according to a PDSCH mapping type. Because PDSCH mapping type B may also serve a usage other than URLLC, an MCS table may be indicated by a time domain resource allocation field. Information indicating an MCS table to be used may be added in an entry of an indication table of the time domain resource allocation field. The information indicating an MCS table to be used may be used to identify an MCS table for a target BLER. Information indicating a different MCS table depending on whether 256-ary quadrature amplitude modulation (256QAM) is used and/or pi/2-binary phase shift keying (BPSK) is used may be transmitted UE-specifically by higher-layer signaling. For example, information indicating a QAM related to an MCS table to be used by the UE may include information indicating that the UE is to use an MCS table related to 256QAM or information indicating that the UE is to use an MCS table related to 64QAM or less. In another example, the MCS table related to 256QAM may be used only when the time domain resource allocation field indicates use of an eMBB table.

Alternatively, it may be regulated that a different MCS table is used according to the periodicity of a search space. An MCS table may be configured according to the periodicity of a search space by a search space configuration. For example, a default MCS table may be used for a specific search space. In a specific example, an MCS table for eMBB and/or BLER=10% may be used for a common search space and/or a search space for a remaining minimum system information CORESET (RMSI CORESET) (i.e., a CORESET configured by a PBCH).

Alternatively, it may be regulated that a different MCS table is used for each DCI format.

Alternatively, a different MCS table may be defined according to the scheduling unit and/or scheduling time duration of data. An MCS table may be preconfigured implicitly for each scheduling unit and/or each scheduling time duration of data. Alternatively, the indication table included in the time domain resource allocation field may include a row with an indication indicating which MCS table is to be used. When the number of bits in the time domain resource allocation field is equal to or less than a specific value, it may be regulated that an MCS table for URLLC is used. For example, when DCI-based time domain resource allocation (RA) is not performed, an MCS table for URLLC may be used for the UE. The UE may assume that allocated time domain resources are not flexible in URLLC.

Alternatively, sets of MCS values may be predefined. The sets of MCS values may be configured for the UE by physical-layer signaling or higher-layer signaling. Alternatively, a plurality of MCS tables may be defined in the form of a single MCS table. The plurality of MCS tables may include common MCS entries. An MCS offset may be indicated by DCI. To indicate the MCS offset, a separate field may be configured in the DCI, or the DCI may be linked to the time domain allocation field. The UE may select an MCS by taking an MCS field and an MCS offset in combination. The UE may select an MCS by taking DCI field values in combination. A newly defined MCS may merely include some states in addition to an existing MCS. The added states may be related to a lowest MCS. When a new MCS is defined just by adding some states an existing MCS, the MCS may be represented by a combination of DCI field values (e.g., RA set to full). For example, an MCS table may include N entries in total, ranging from entry (or index) 0 to entry (index) N−1. Basically, the UE may be configured to use M MCS entries from N−M−1 (M<N) to N−1. Additionally, despite a default configuration, the UE may be configured to use entries 0 to M−1 or offset value to M+offset value−1 according to an offset represented by a combination of specific fields. The UE may derive the offset by interpreting the combination of the specific fields.

Alternatively, a different RNTI may be assigned to the UE, for each requirement. When requirements are grouped, a different RNTI may be assigned to the UE, for each group of requirements. The requirements may include one or more of a reliability requirement, a latency requirement, a target BLER, a service type, a TTI length, a numerology, and a processing time, as described before. The UE may identify an RNTI related to a received channel and determine an MCS table to be used, based on the identified RNTI.

For example, the UE may be configured with a plurality of MCS tables by higher-layer signaling (e.g., RRC signaling). Alternatively, the plurality of MCS tables may be predefined for the UE.

As described before, a PDCCH may be used to schedule a PUSCH or a PDSCH. An RNTI by which a PDCCH for scheduling a data channel is masked and/or CRC-scrambled may be determined based on a channel-specific requirement. For example, a PDCCH that schedules a specific channel may be CRC-masked and/or scrambled with a different RNTI according to a BLER required for the specific channel. Different RNTIs may be determined for a channel with a BLER of 10% and a channel with a BLER of 0.0001%. The eNB may configure different RNTIs for use in CRC scrambling of a PDCCH for scheduling a channel with a BLER of 10% and a PDCCH for scheduling a channel with a BLER of 0.0001%. An RNTI defined in the legacy system may be used. Alternatively, an RNTI may be newly defined for configuring an MCS table. The newly defined RNTI may be referred to as an MCS-cell-RNTI (MCS-C-RNTI). The eNB may configure the defined RNTI for a specific UE and assign the RNTI to the specific UE. The UE may be configured with the RNTI received from the eNB.

The UE may receive a PDCCH that schedules a PDSCH or a PUSCH. The UE identifies an RNTI by which the PDCCH has been CRC-masked and/or CRC-scrambled.

An MCS table corresponding to the RNTI identified by the UE may have been configured. The UE may determine an MCS table for use in receiving a PDSCH scheduled by the PDCCH or transmitting a PUSCH scheduled by the PDCCH, based on the identified RNTI. The BLER of a channel scheduled by a PDCCH with a CRC scrambled by the MCS-C-RNTI may be different from the BLER of a channel scheduled by a PDCCH with a CRC scrambled by another RNTI. Accordingly, the two channels with different BLERs may use different MCS tables. Whether the newly defined RNTI related to an MCS table has been configured for the UE or an RNTI related to a specific channel has been configured for the UE may further be considered.

When a received PDCCH is CRC-scrambled with the MCS-C-RNTI, the UE may be configured to use a first MCS table and otherwise, a second MCS table. Alternatively, when the received PDCCH is CRC-scrambled with the MCS-C-RNTI, the UE may be configured to use the first MCS table. When the received PDCCH is CRC-scrambled with a cell-RNTI (C-RNTI) or configured scheduling-RNTI (CS-RNTI), the UE may be configured to use the second MCS table. Otherwise, the UE may be configured to use a third MCS table. Alternatively, an additional condition (e.g., information indicating a QAM related to an MCS table to be used by the UE, a DCI format, and/or repeated transmission or non-repeated transmission and the type of a repeated transmission configuration of a PDSCH (or PUSCH)) may further be considered. Even for one RNTI, the UE may be configured to use the first MCS table when an additional first condition is satisfied, and the second MCS table when an additional second condition is satisfied. Alternatively, when a received PDCCH is CRC-scrambled with the MCS-C-RNTI, the UE may be configured to use the first MCS table. When the received PDCCH is CRC-scrambled with the CS-RNTI and the additional first condition is satisfied, the UE may be configured to use the second MCS table. When the received PDCCH is CRC-scrambled with the CS-RNTI and the additional second condition is satisfied, the UE may be configured to use the first MCS table.

Table 13 to Table 17 are exemplary MCS tables available to the UE.

TABLE 13

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 3 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 14

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 303 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |

TABLE 14-continued

| MCS Index $I_{MCS}$ | Modulation Order $Q_m$ | Target code Rate R x [1024] | Spectral efficiency |
|---|---|---|---|
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 15

| MCS Index $I_{MCS}$ | Modulation Order $Q_m$ | Target code Rate R x [1024] | Spectral efficiency |
|---|---|---|---|
| 0 | 2 | 38 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 18 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 28 | 2 | reserved | |
| 30 | 4 | reserved | |
| 31 | 6 | reserved | |

TABLE 16

| MCS Index $I_{MCS}$ | Modulation Order $Q_m$ | Target code Rate R x 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |

TABLE 16-continued

| MCS Index $I_{MCS}$ | Modulation Order $Q_m$ | Target code Rate R x 1024 | Spectral efficiency |
|---|---|---|---|
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 26 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

TABLE 17

| MCS Index $I_{MCS}$ | Modulation Order $Q_m$ | Target code Rate R x 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 26 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

The UE may use an MCS field $I_{mcs}$ included in DCI received on a PDCCH and a determined MCS table to determine a modulation order $Q_m$ and a target code rate R for PDSCH reception or PUSCH transmission. The UE may select an MCS index indicated by the MCS field in the determined MCS table. The UE may decode and/demodulate a PDSCH based on the selected MCS index. The UE may encode and/or modulate a PUSCH based on the selected MCS index.

Alternatively, there may be a difference between the number of bits (e.g., X bits) in the CRC of a control channel for data channel scheduling and the number of bits in a UE ID (e.g., a Y-bit RNTI). When the number of bits in the UE ID is less than the number of the CRC bits (e.g., X>Y), all or a part of as many bits as the difference (X-Y) may be used to indicate an MCS table to be used by the UE. Alternatively, all or a part of as many bits as the difference may be used to indicate an MCS offset. All or a part of as many bits as the difference may be used to indicate both of the CQI table to be used by the UE and the CQI offset.

CSI Reporting for Different Requirements

CSI may be reported on one channel based on CSI reference resources for different requirements. For example, a different target BLER may be set for each CSI process, and the UE may report CSI for a plurality of CSI processes having different target BLERs on one channel.

When CSI is reported on one channel, it may be determined differently whether the CSI is to be reported according to the requirement of the channel carrying the CSI report. For example, when CSI is reported on a PUSCH having a target BLER of 0.001%, the UE may report only CSI for a CSI process having the target BLER of 0.001%. When CSI is reported on a PUSCH having a target BLER of 10%, the UE may report CSI for all triggered CSI processes. The UE may include CSI for a CSI process having a less strict requirement than a channel carrying a CSI report, in the channel.

Alternatively, a channel carrying a CSI report may be determined differently according to the requirement of a CSI process. For example, a CSI report for a CSI process having a target BLER of 0.001% may be transmitted on a PUSCH having the target BLER of 0.001%. A CSI report for a CSI process having a target BLER of 10% may be transmitted on a PUSCH having the target BLER of 10%. Even though a CSI report for a CSI process having the target BLER of 10% is scheduled on a PUSCH having the target BLER of 0.001%, the CSI report may be transmitted on a channel in a cell/TTI different from that of the scheduled PUSCH. When CSI (a CSI process) for a CSI reference resource having a specific requirement may not be included even in a channel transmitted in another cell/TTI, it may be regulated that the CSI (CSI process) is dropped.

Alternatively, it may be configured that a channel carrying a CSI report is repeatedly transmitted (time repetition in which the same resource block is repeatedly transmitted in a plurality of TTIs). For each CSI reference resource having a requirement, it may be determined whether to transmit CSI (a CSI process) for the CSI reference resource on a channel which is being repeatedly transmitted. The CSI (CSI process) may also be transmitted repeatedly at each repeated transmission of the channel. The CSI (CSI process) may be transmitted repeatedly only a predetermined number of times, together with the repeatedly transmitted channel. For example, a CSI report for a CSI process having a target BLER of 0.001% is transmitted together repeatedly at each transmission of a repeatedly transmitted channel, and a CSI report for a CSI process having a target BLER of 10% is transmitted only at the first transmission (or a specific indicated/configured transmission) of a repeatedly transmitted channel.

Semi-Persistent Scheduling (SPS) with Different Requirements

In SPS, the periodicity of repeated transmission of a data channel is configured for the UE by higher-layer signaling. The UE may transmit and receive the data channel even without DCI for resource configuration until before an SPS configuration is released. Because there is no DCI for scheduling the resources of each of repeatedly transmitted data channels, a method of indicating the requirement of a data channel to a UE may be proposed.

A different SPS resource may be configured for each requirement. Along with an SPS configuration, a requirement for the SPS configuration may also be configured. When a data channel is transmitted in a predetermined resource (or periodically) without scheduling DCI, the same thing may be applied even without an SPS configuration.

Data channels transmitted according to a plurality of SPS configurations may overlap with each other over a specific time period. When data channels are overlapped with each other over a predetermined time period, data channels to be transmitted may be determined according to the priorities of requirements for the SPS configurations. For example, a data channel related to an SPS configuration set to higher reliability, a lower latency, a lower BLER, a shorter TTI length, a larger SCS, or a shorter processing time may be transmitted, while a data channel related to an SPS configuration with a relatively low priority may be dropped.

Alternatively, one or more of the transmission reliability, latency, target BLER, and service type requirements of an SPS transmission may be linked to one or more of a TTI length, a numerology, a processing time, and a transmission periodicity. Once one or more of the TTI length, numerology, processing time, and transmission periodicity of an SPS-based data channel are configured, one or more of the transmission reliability, latency, target BLER, and service type requirements of the SPS-based data channel may be determined implicitly.

Alternatively, information about one or more requirements may be transmitted in a physical signal (L1 signaling, for example, on a PDCCH) for activating SPS. The information about one or more requirements may be represented by combining specific states of specific fields (or one or more newly defined fields) in the L1 signaling for activating transmission of an SPS-based data channel.

CSI Update/Calculation-Related Capability for sTTI

The UE may report its UE capability to the network. The UE capability may include a maximum simultaneous CSI update/calculation capability of the UE. In an sTTI-related operation, a processing time may vary according to a DL and UL TTI length combination, thus leading to a different simultaneous CSI update/calculation capability of the UE. For example, in an sTTI-related operation, a PDSCH reception to HARQ-ACK transmission timing gap and/or a UL grant reception to PUSCH transmission timing gap may vary according to a combination of DL and UL TTI lengths. The UE combines one or more of a DL and UL TTI length combination, a processing time, a maximum timing advance (TA) value, a short PDCCH (sPDCCH) RS type, and the number of sPDCCH symbols, and reports its simultaneous CSI update/calculation capability for each combination to the network. The CSI update/calculation capability may be reported on a cell basis and/or on a CSI process basis. The UE may combine one or more of the DL and UL TTI length combination, the processing time, the maximum TA value, the sPDCCH RS type, and the number of sPDCCH symbols, and report its capability on a maximum number of simultaneous CSI reports for each combination to the network. The UE may transmit the capability report on a frequency band basis. The UE may transmit the capability report on a frequency band combination basis. A different UE capability reporting rule may be defined for each frequency band or each frequency band combination. The UE may not be indicated to perform update/calculation for cells and/or CSI processes beyond its reported CSI update/calculation capability.

For example, the UE may transmit, to the network, information indicating a maximum number of updatable CSI processes, for each combination of DL and UL TTI lengths. A parameter/indicator may be configured to represent the information indicating the maximum number of updatable CSI processes, for each combination of DL and UL TTI lengths. The UE may also report information about all or a part of combinations to the network. DL and UL TTI length combinations may be produced as listed in Table 18 below.

TABLE 18

| DL | UL |
|---|---|
| Slot | Slot |
| Subslot | Slot |
| Subslot | Subslot |

A DL and UL combination of {Slot, Slot} may be referred to as Comb77, a DL and UL combination of {Subslot, Slot} may be referred to as Comb27, and a DL and UL combination of {Sublot, Sublot} may be referred to as Comb22.

For Comb22, two sets of processing timelines may be configured. Each set may have different processing timelines in terms of a maximum TA. For processing timeline set 1, a minimum processing timeline may be set to n+4 or n+6, and for processing timeline set 2, a minimum processing timeline may be set to n+6 or n+8. A range of TA values may be set for each processing timeline set as listed in Table 19 below.

TABLE 19

| Range of $N_{TA}$ | proc-Timeline |
|---|---|
| $0 \leq N_{TA} \leq 2048$ | nplus4set1 |
| $0 \leq N_{TA} \leq 10816$ | nplus6set1 |
| $0 \leq N_{TA} \leq 5120$ | nplus6set2 |
| $0 \leq N_{TA} \leq 13888$ | nplus8set2 |

For each of four combinations produced from Comb77, Comb27, and processing timeline set 1 of Comb22 (Comb22-Set1) and processing timeline set 2 of Comb22 (Comb22-Set2), the UE may transmit information indicating a maximum number of updatable CSI processes to the network. Four parameters/indicators may be configured to represent the information indicating the maximum number of updatable CSI processes for each of the four combinations. The maximum number of updatable CSI processes may be set to range from 1 to 32.

The UE may report its UE capability, upon request of the eNB. Upon receipt of the request from the eNB, the UE may report four parameters/indicator for four combinations as its UE capability to the network. The UE may then expect not to receive an indication indicating CSI process updates beyond its reported UE capability.

Figure 10:
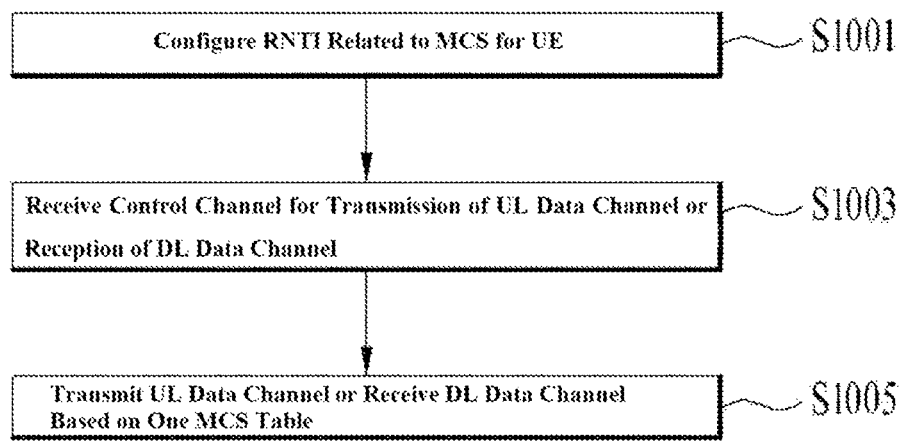
FIG. 10 is a conceptual view illustrating a method according to an embodiment of the present disclosure.

FIG. 10 is a conceptual view illustrating a method of transmitting and receiving a signal according to embodiments of the present disclosure.

Referring to FIG. 10, the signal transmission and reception method according to embodiments of the present disclosure may include configuring an RNTI related to an MCS (S1001), receiving a control channel for scheduling transmission of a UL data channel or reception of a DL data channel (S1003), and transmitting the UL data channel or receiving the DL data channel, which has been scheduled by the control channel, based on one of a plurality of MCS tables (S1005).

Particularly, the MCS table may be determined based on the RNTI related to an MCS and an RNTI related to the control channel. The MCS table may be determined in further consideration of information indicating a QAM related to the MCS table to be used by the UE, received by higher-layer signaling.

The signal transmission and reception method according to embodiments of the present disclosure may further include transmitting UE capability information to a network. The UE capability information may include information about the number of updatable CSI processes for each DL and UL TTI length combination. The information about the number of updatable CSI processes for each DL and UL TTI length combination may include a first indicator indicating the number of CSI processes for a combination of slot and slot as the DL and UL TTI length combination, a second indicator indicating the number of CSI processes for a combination of subslot and slot as the DL and UL TTI length combination, a third indicator indicating the number of CSI processes for a combination of subslot and subslot as the DL and UL TTI length combination and a configured first processing time, and a fourth indicator indicating the number of CSI processes for a combination of subslot and subslot as the DL and UL TTI length combination and a configured second processing time. In addition to the above-described operation, one or more of the operations proposed in the embodiments of the present disclosure may be performed in combination.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, a rule may be defined such that information on whether the proposed methods are applied (or information on rules related to the proposed methods) should be transmitted from a BS to a UE through a predefined signal (e.g., a physical layer signal, a higher layer signal, etc.).

Device Configuration

Figure 11:
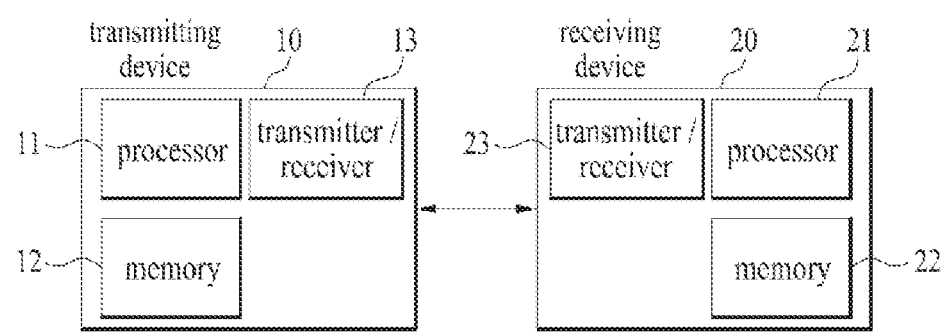
FIG. 11 is a block diagram showing an apparatus for embodying embodiment(s) of the present disclosure.

FIG. 11 is a block diagram illustrating a transmitting device 10 and a receiving device 20 configured to implement embodiments of the present disclosure. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present disclosure described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present disclosure. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present disclosure, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present disclosure. In the case which the present disclosure is implemented using firmware or software, the firmware or software may be provided with a module, a procedure, a function, or the like which performs the functions or operations of the present disclosure. The firmware or software configured to implement the present disclosure may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present disclosure, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present disclosure, the UE or the terminal operates as the transmitting device 10 on UL, and operates as the receiving device 20 on DL. In embodiments of the present disclosure, the eNB or the base station operates as the receiving device 20 on UL, and operates as the transmitting device 10 on DL.

The transmitting device and/or receiving device may be implemented by one or more embodiments of the present disclosure among the embodiments described above.

Detailed descriptions of preferred embodiments of the present disclosure have been given to allow those skilled in the art to implement and practice the present disclosure. Although descriptions have been given of the preferred embodiments of the present disclosure, it will be apparent to those skilled in the art that various modifications and variations can be made in the present disclosure defined in the appended claims. Thus, the present disclosure is not intended to be limited to the embodiments described herein, but is intended to have the widest scope consistent with the principles and novel features disclosed herein.

As described above, the present disclosure is applicable to various wireless communication systems.

What is claimed is:

1. A method of transmitting and receiving a signal, performed by a Base Station (BS) in a wireless communication system, the method comprising:
   receiving user equipment (UE) capability information from a UE,
   wherein the UE capability information includes (i) first information regarding a maximum number of Channel State Information (CSI) processes that can be updated for a first processing time of a combination of downlink/uplink Transmission Time Interval (TTI) length and (ii) second information regarding a maximum number of CSI processes that can be updated for a second processing time of the combination of downlink/uplink TTI length,
   wherein the combination of downlink/uplink TTI length is subslot/subslot, and
   wherein the UE capability information further includes (iii) third information regarding a maximum number of CSI processes that can be updated for a combination of downlink/uplink TTI length as slot/slot and (iv) fourth information regarding a maximum number of CSI processes that can be updated for a combination of downlink/uplink TTI length as subslot/slot; and
   transmitting, to the UE, an update request for one or more CSI processes,
   wherein a number of the one or more CSI processes is not larger than a number of CSI processes reported by the UE capability information.

2. The method according to claim 1, wherein the BS is configured to communicate with at least one of UEs, a UE related to an autonomous driving vehicle.

3. A Base Station (BS) for transmitting and receiving a signal in a wireless communication system, the BS comprising:
   a transceiver;
   a processor configured to control the transceiver; and
   a non-transitory computer-readable storage medium storing instructions that, based on being executed by the processor, perform operations comprising:
   controlling the transceiver to receive User Equipment (UE) capability information from a UE,
   wherein the UE capability information includes (i) first information regarding a maximum number of Channel State Information (CSI) processes that can be updated based on a first processing time configured for a combination of downlink/uplink Transmission Time Interval (TTI) length and (ii) second information regarding a maximum number of CSI processes that can be updated based on a second processing time configured for the combination of downlink/uplink TTI length, wherein the combination of downlink/uplink TTI length is subslot/subslot, and wherein the UE capability information further includes (iii) third information regarding a maximum number of CSI processes that can be updated for a combination of downlink/uplink TTI length as slot/slot and (iv) fourth information regarding a maximum number of CSI processes that can be updated for a combination of downlink/uplink TTI length as subslot/slot; and controlling the transceiver to transmit, to the UE, an update request for one or more CSI processes, wherein a number of the one or more CSI processes is not larger than a number of CSI processes reported by the UE capability information.

4. The BS according to claim 3, wherein the BS is configured to communicate with at least one of UEs, a UE related to an autonomous driving vehicle.

5. A non-transitory computer-readable storage medium storing instructions that, based on being executed by a processor, perform operations comprising:

receiving User Equipment (UE) capability information from the UE, wherein the UE capability information includes (i) first information regarding a maximum number of Channel State Information (CSI) processes that can be updated based on a first processing time configured for a combination of downlink/uplink Transmission Time Interval (TTI) length and (ii) second information regarding a maximum number of CSI processes that can be updated based on a second processing time configured for the combination of downlink/uplink TTI length, wherein the combination of downlink/uplink TTI length is subslot/subslot, and wherein the UE capability information further includes (iii) third information regarding a maximum number of CSI processes that can be updated for a combination of downlink/uplink TTI length as slot/slot and (iv) fourth information regarding a maximum number of CSI processes that can be updated for a combination of downlink/uplink TTI length as subslot/slot; and transmitting, to the UE, an update request for one or more CSI processes, wherein a number of the one or more CSI processes is not larger than a number of CSI processes reported by the UE capability information.

* * * * *